US012798698B2

(12) United States Patent
Moccio et al.

(10) Patent No.: US 12,798,698 B2
(45) Date of Patent: Nov. 17, 2026

(54) SPARE WHEEL CARRIER FOR A VEHICLE

(71) Applicant: Scout Motors Inc., Tysons, VA (US)

(72) Inventors: Craig Moccio, Milan, MI (US); Craig Pearson, Northville, MI (US); Marcus Merideth, South Lyon, MI (US); Steven Pisarski, Troy, MI (US); Ken Reo, Macomb, MI (US); Mike Norman, Wixom, MI (US); Martin Wekerle, Berkley, MI (US); Robin Borthwick, Rochester, MI (US); Chad Parsons, Metamora, MI (US); Josh Henry, Ferndale, MI (US); Roland Duerrauer, Graz (AT)

(73) Assignee: Scout Motors Inc., Tysons, VA (US)

( * ) Notice: Subject to any disclaimer, the term of this patent is extended or adjusted under 35 U.S.C. 154(b) by 154 days.

(21) Appl. No.: 18/923,499

(22) Filed: Oct. 22, 2024

(65) Prior Publication Data

US 2026/0109412 A1 Apr. 23, 2026

Related U.S. Application Data

(63) Continuation of application No. 18/923,413, filed on Oct. 22, 2024.

(51) Int. Cl.
*B62D 43/02* (2006.01)
*B60J 1/18* (2006.01)
(Continued)

(52) U.S. Cl.
CPC ............ *B62D 43/02* (2013.01); *B60J 1/1884* (2013.01); *B60J 5/103* (2013.01); *B60Q 1/30* (2013.01); *B62D 43/005* (2013.01)

(58) Field of Classification Search
CPC ........... B60J 1/1884; B60J 5/103; B60Q 1/30; B62D 33/027; B62D 43/005; B62D 43/02
(Continued)

(56) References Cited

U.S. PATENT DOCUMENTS 4,771,926 A 9/1988 Anderson et al.
5,094,374 A 3/1992 Lee
(Continued)

FOREIGN PATENT DOCUMENTS

JP S6256822 B2 * 11/1987
JP H0840317 A * 2/1996
(Continued)

OTHER PUBLICATIONS

JP-H0840317-A Translation, Suzuki Tsuuyou, Apr. 13, 1996 (Year: 1996).*

(Continued)

*Primary Examiner* — Nathan J Newhouse
*Assistant Examiner* — Matthew T Theis
(74) *Attorney, Agent, or Firm* — Meunier Carlin & Curfman LLC

(57) ABSTRACT

A vehicle may include a first rear pillar. A vehicle may include a second rear pillar spaced from the first rear pillar. A vehicle may include a bench gate pivotable between the first rear pillar and the second rear pillar. A vehicle may include a window gate arranged above the bench gate, the bench gate and the window gate defining an interface seam. A vehicle may include a spare wheel carrier including: a hinge bracket rigidly coupled to the first rear pillar, the hinge bracket including a first hinge stud, and a second hinge stud, the interface seam positioned between the first hinge stud and the second hinge stud, a strike plate rigidly coupled to the second rear pillar; and a carrier beam rotatably coupled to the first hinge stud and the second hinge stud and (Continued)

including a latch positioned to selectively engage the strike plate.

20 Claims, 23 Drawing Sheets

(51) Int. Cl.
*B60J 5/10* (2006.01)
*B60Q 1/30* (2006.01)
*B62D 43/00* (2006.01)

(58) Field of Classification Search
USPC .......................................................... 224/509
See application file for complete search history.

(56) References Cited

U.S. PATENT DOCUMENTS 5,186,371 A 2/1993 Jozefczak et al.
5,333,766 A 8/1994 Fisher
5,538,168 A * 7/1996 Burger ................... B62D 43/02 224/42.28
2002/0084298 A1 7/2002 Essig
2004/0222261 A1 11/2004 Wilson
2007/0039987 A1 2/2007 Osenkowski
2008/0047985 A1 2/2008 Newbill
2020/0298917 A1 * 9/2020 Unger .................... B62D 43/02

FOREIGN PATENT DOCUMENTS

JP H08142679 A * 6/1996
JP H09156541 A * 6/1997

OTHER PUBLICATIONS

JP-H08142679-A Translation, Sato Junichi, Jun. 4, 1996 (Year: 1996).*
JP-H09156541-A Translation, Tanaka Hiroaki, Jun. 17, 1997 (Year: 1997).*
JP-S6256822-B2 Translation, Tanaka Seiji, Nov. 27, 1987 (Year: 1987).*
International Searching Authority (ISA/EP). International Search Report and Written Opinion. PCT/US2025/052010. Mar. 2, 2026. 11 pages.

* cited by examiner

SPARE WHEEL CARRIER FOR A VEHICLE

CROSS REFERENCE TO RELATED APPLICATIONS

This application is a continuation of U.S. patent application Ser. No. 18/923,413, filed on Oct. 22, 2024, the entire contents of which are incorporated by reference herein.

BACKGROUND

This disclosure relates to spare wheel carriers mounted on a rear of a vehicle. More specifically, this disclosure relates to spare wheel carriers that swing away from the rear of the vehicle.

SUMMARY

In some aspects, the techniques described herein relate to a spare wheel carrier for a vehicle, the spare wheel carrier including: a hinge bracket configured to rigidly couple to a first rear pillar, the hinge bracket including: a first hinge stud, and a second hinge stud; a strike plate configured to rigidly couple to a second rear pillar arranged on an opposite side of the vehicle from the first rear pillar; a frame lower support configured to rigidly couple to a lower frame member arranged between the first rear pillar and the second rear pillar; and a carrier beam rotatably coupled to the first hinge stud and the second hinge stud and including: a latch positioned to selectively engage the strike plate, and a gate lower support positioned to selectively engage the frame lower support.

In some aspects, the techniques described herein relate to a spare wheel carrier, wherein the strike plate includes a strike plate receiver, and wherein the latch includes a latch pin sized to be received within the strike plate receiver.

In some aspects, the techniques described herein relate to a spare wheel carrier, wherein the frame lower support includes a lower support pin, and wherein the gate lower support includes a lower support receiver sized to receive the lower support pin.

In some aspects, the techniques described herein relate to a spare wheel carrier, wherein the lower support receiver includes an elastomeric inner sleeve.

In some aspects, the techniques described herein relate to a spare wheel carrier, wherein the lower support pin and the lower support receiver provides preload less than 100 N.

In some aspects, the techniques described herein relate to a spare wheel carrier, wherein the lower support pin and the lower support receiver provides preload defining a preload length of 2 mm to 6 mm.

In some aspects, the techniques described herein relate to a spare wheel carrier, wherein the latch includes a latch pin, wherein the frame lower support includes a lower support pin, and wherein the lower support pin is separated from the latch pin by a vertical distance of 250 mm to 350 mm.

In some aspects, the techniques described herein relate to a spare wheel carrier, wherein the first hinge stud defines a first hinge interface plane, wherein the second hinge stud defines a second hinge interface plane, and wherein the first hinge interface plane is spaced from the second hinge interface plane by 150 mm to 225 mm.

In some aspects, the techniques described herein relate to a spare wheel carrier, wherein the hinge bracket includes a hinge strut bracket, and wherein the carrier beam includes a carrier strut mount, the spare wheel carrier further including a strut extending between the hinge strut bracket and the carrier strut mount.

In some aspects, the techniques described herein relate to a spare wheel carrier, wherein the hinge strut bracket is positioned between the first hinge stud and the second hinge stud.

In some aspects, the techniques described herein relate to a spare wheel carrier, wherein the first hinge stud defines a first hinge interface plane, wherein the second hinge stud defines a second hinge interface plane, and wherein the hinge strut bracket is positioned between the first hinge interface plane and the second hinge interface plane.

In some aspects, the techniques described herein relate to a spare wheel carrier, further including a handle coupled to the carrier beam and configured to control operation of the latch.

In some aspects, the techniques described herein relate to a spare wheel carrier, further including a wheel cover coupled to the carrier beam.

In some aspects, the techniques described herein relate to a spare wheel carrier, wherein the wheel cover is rotationally coupled to the carrier beam by a cover hinge.

In some aspects, the techniques described herein relate to a spare wheel carrier, further including a wheel projection extending from the carrier beam and configured to fasten to a spare wheel.

In some aspects, the techniques described herein relate to a spare wheel carrier for a vehicle, the spare wheel carrier including: a hinge bracket including: a first hinge stud, and a second hinge stud; a carrier beam rotatably coupled to the first hinge stud and the second hinge stud; a latch pin coupled to the carrier beam and spaced from the hinge bracket; a strike plate receiver sized to receive the latch pin; a lower support extending downwardly from the carrier beam; a lower support receiver coupled to the lower support; and a lower support pin sized to be received within the lower support receiver, wherein the lower support receiver is spaced vertically below the latch pin by 250 mm to 350 mm.

In some aspects, the techniques described herein relate to a spare wheel carrier, wherein the lower support pin and the lower support receiver provides preload less than 100 N, or a preload length of 2 mm to 6 mm.

In some aspects, the techniques described herein relate to a spare wheel carrier, wherein the latch pin is positioned adjacent a latch.

In some aspects, the techniques described herein relate to a spare wheel carrier for a vehicle, the spare wheel carrier including: a hinge bracket defining a first hinge interface plane and a second hinge stud defining a second hinge interface plane; a carrier beam rotationally coupled to the hinge bracket; a strut extending between the hinge bracket and the carrier beam between the first hinge interface plane and the second hinge interface plane; a latch pin coupled to the carrier beam opposite the hinge bracket; and a lower support pin coupled to the carrier beam via a lower support.

In some aspects, the techniques described herein relate to a spare wheel carrier, wherein the first hinge interface plane is spaced from the second hinge interface plane by 150 mm to 225 mm.

In some aspects, the techniques described herein relate to a vehicle including: a first rear pillar; a second rear pillar spaced from the first rear pillar; a bench gate pivotable between the first rear pillar and the second rear pillar; a window gate arranged above the bench gate, the bench gate and the window gate defining an interface seam; and a spare wheel carrier including: a hinge bracket rigidly coupled to the first rear pillar, the hinge bracket including a first hinge stud, and a second hinge stud, the interface seam positioned between the first hinge stud and the second hinge stud; a strike plate rigidly coupled to the second rear pillar; and a carrier beam rotatably coupled to the first hinge stud and the second hinge stud and including a latch positioned to selectively engage the strike plate.

In some aspects, the techniques described herein relate to a vehicle, further including: a first rear light coupled to the first rear pillar; and a second rear light coupled to the second rear pillar, wherein the spare wheel carrier is positioned between the first rear light and the second rear light.

In some aspects, the techniques described herein relate to a vehicle, wherein the carrier beam defines a height between an upper extremity and a lower extremity of 250 mm to 350 mm.

In some aspects, the techniques described herein relate to a vehicle, wherein the first hinge stud defines a first hinge interface plane, wherein the second hinge stud defines a second hinge interface plane, and wherein the first hinge interface plane is spaced from the second hinge interface plane by 150 mm to 225 mm.

In some aspects, the techniques described herein relate to a vehicle, wherein the interface seam extends substantially parallel to a ground plane.

In some aspects, the techniques described herein relate to a vehicle, further including: a first rear light coupled to the first rear pillar, wherein the hinge bracket is coupled to the first rear pillar behind the first rear light.

In some aspects, the techniques described herein relate to a vehicle, further including: a lower frame member extending between the first rear pillar and the second rear pillar; and a lower support pin coupled to the lower frame member, wherein the spare wheel carrier includes a lower support receiver coupled to the carrier beam and sized to receive the lower support pin.

In some aspects, the techniques described herein relate to a vehicle, wherein the spare wheel carrier further includes a lower support extending downward from the carrier beam and supporting the lower support receiver.

In some aspects, the techniques described herein relate to a vehicle, wherein the lower support pin and the lower support receiver provides preload less than 100 N.

In some aspects, the techniques described herein relate to a vehicle, wherein the lower support pin and the lower support receiver provides a preload length of 2 mm to 6 mm.

In some aspects, the techniques described herein relate to a vehicle, wherein latch includes a latch pin, wherein the strike plate includes a strike plate receiver sized to receive the latch pin, and wherein the lower support pin is separated from the latch pin by a vertical distance of 250 mm to 350 mm.

In some aspects, the techniques described herein relate to a vehicle, wherein the latch includes a latch pin, and wherein the strike plate includes a strike plate receiver sized to receive the latch pin.

In some aspects, the techniques described herein relate to a vehicle, further including: a strut extending between the hinge bracket and the carrier beam between the first hinge stud and the second hinge stud.

In some aspects, the techniques described herein relate to a vehicle, wherein the spare wheel carrier further includes a wheel cover rotationally coupled to the carrier beam by a cover hinge.

In some aspects, the techniques described herein relate to a vehicle, wherein the spare wheel carrier further includes a wheel projection extending from the carrier beam and configured to fasten to a spare wheel.

In some aspects, the techniques described herein relate to a vehicle including: a first rear pillar; a second rear pillar spaced from the first rear pillar; a lower frame member extending between the first rear pillar and the second rear pillar; a bench gate pivotable relative to the lower frame member; a window gate arranged above the bench gate, the bench gate and the window gate defining an interface seam; a hinge bracket rigidly coupled to the first rear pillar, the hinge bracket including a first hinge stud, and a second hinge stud; a strike plate receiver rigidly coupled to the second rear pillar; a lower support pin rigidly coupled to the lower frame member; and a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position.

In some aspects, the techniques described herein relate to a vehicle, wherein the first hinge stud is spaced from the second hinge stud by 150 mm to 225 mm.

In some aspects, the techniques described herein relate to a vehicle, wherein the carrier beam defines a height between an upper extremity and a lower extremity of 250 mm to 350 mm.

In some aspects, the techniques described herein relate to a vehicle including: a first rear pillar; a second rear pillar spaced from the first rear pillar; a lower frame member extending between the first rear pillar and the second rear pillar; a bench gate pivotable relative to the lower frame member; a window gate arranged above the bench gate, the bench gate and the window gate defining an interface seam; and a spare wheel carrier including: a hinge bracket rigidly coupled to the first rear pillar, the hinge bracket including a first hinge stud, and a second hinge stud; a strike plate receiver rigidly coupled to the second rear pillar; a lower support pin rigidly coupled to the lower frame member; a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position, the carrier beam defines a height between an upper extremity and a lower extremity of 250 mm to 350 mm; and a wheel cover coupled to the carrier beam and configured to surround a wheel fastened to the carrier beam.

In some aspects, the techniques described herein relate to a vehicle, wherein the lower support pin and the lower support receiver provides preload less than 100 N, or a preload length of 2 mm to 6 mm.

In some aspects, the techniques described herein relate to a spare wheel carrier for a vehicle, the spare wheel carrier including: a hinge bracket configured to be rigidly coupled to a first rear pillar of the vehicle and including: a first hinge defining a hinge axis, and a second hinge positioned on the hinge axis, wherein the second hinge spaced from the first hinge by less than 300 mm; a carrier beam rotatably coupled to the first hinge and the second hinge, the carrier beam configured to support a spare wheel; and a strut coupled between the hinge bracket and the carrier beam and positioned between the first hinge and the second hinge.

In some aspects, the techniques described herein relate to a spare wheel carrier, wherein the first hinge defines a first hinge interface plane, wherein the second hinge defines a second hinge interface plane, and wherein the first hinge interface plane is spaced from the second hinge interface plane by 150 mm to 225 mm.

In some aspects, the techniques described herein relate to a spare wheel carrier, wherein the carrier beam defines a height between an upper extremity and a lower extremity of 250 mm to 350 mm.

In some aspects, the techniques described herein relate to a spare wheel carrier, further including: a wheel projection extending from the carrier beam and sized to receive the spare wheel.

In some aspects, the techniques described herein relate to a spare wheel carrier, further including: a lower support pin; and a lower support receiver coupled to the carrier beam and sized to receive the lower support pin.

In some aspects, the techniques described herein relate to a spare wheel carrier, further including: a lower support extending downward from the carrier beam and supporting the lower support receiver.

In some aspects, the techniques described herein relate to a spare wheel carrier, wherein the lower support pin and the lower support receiver provides preload less than 100 N.

In some aspects, the techniques described herein relate to a spare wheel carrier, wherein the lower support pin and the lower support receiver provides a preload length of 2 mm to 6 mm.

In some aspects, the techniques described herein relate to a spare wheel carrier, further including: a latch coupled to the carrier beam; a latch pin coupled to the carrier beam, a strike plate positioned to engage the latch; and a strike plate receiver sized to receive the latch pin.

In some aspects, the techniques described herein relate to a spare wheel carrier, wherein the lower support pin is separated from the latch pin by a vertical distance of 250 mm to 350 mm.

In some aspects, the techniques described herein relate to a spare wheel carrier, further including a handle coupled to the carrier beam and configured to control operation of the latch.

In some aspects, the techniques described herein relate to a spare wheel carrier, further including: a wheel cover coupled to the carrier beam by a cover hinge and a removable fastener.

In some aspects, the techniques described herein relate to a spare wheel carrier, wherein the wheel cover includes a license plate mount, license plate lights, and a reverse camera.

In some aspects, the techniques described herein relate to a spare wheel carrier, wherein the carrier beam is sized to be received between rear lights of the vehicle.

In some aspects, the techniques described herein relate to a spare wheel carrier, wherein the hinge bracket includes an upper bracket pad and a lower bracket pad configured to engage the first rear pillar, and wherein the first hinge and the second hinge are positioned between the upper bracket pad and the lower bracket pad.

In some aspects, the techniques described herein relate to a spare wheel carrier for a vehicle, the spare wheel carrier including: a hinge bracket configured to be rigidly coupled to a first rear pillar of the vehicle and including: a first hinge defining a first hinge interface plane, and a second hinge defining a second hinge interface plane, wherein the first hinge interface plane is spaced from the second hinge interface plane by 150 mm to 225 mm; a carrier beam rotatably coupled to the first hinge and the second hinge, the carrier beam configured to support a spare wheel; and a strut coupled between the hinge bracket and the carrier beam and positioned between the first hinge interface plane and the second hinge interface plane.

In some aspects, the techniques described herein relate to a spare wheel carrier, wherein the hinge bracket further includes a bracket strut mount engaged with the strut, and wherein the strut extends substantially parallel to a ground plane.

In some aspects, the techniques described herein relate to a spare wheel carrier, further including: a latch coupled to the carrier beam; a latch pin coupled to the carrier beam, a strike plate positioned to engage the latch; a strike plate receiver sized to receive the latch pin; a lower support receiver coupled to the carrier beam; and a lower support pin sized to be received by the lower support receiver, wherein the lower support pin is separated from the latch pin by a vertical distance of 250 mm to 350 mm.

In some aspects, the techniques described herein relate to a spare wheel carrier for a vehicle, the spare wheel carrier including: a hinge bracket defining a first hinge interface plane and a second hinge stud defining a second hinge interface plane; a carrier beam rotationally coupled to the hinge bracket and defining a height between an upper extremity and a lower extremity of 250 mm to 350 mm; a strut extending between the hinge bracket and the carrier beam between the first hinge interface plane and the second hinge interface plane; a latch pin coupled to the carrier beam opposite the hinge bracket; and a lower support pin coupled to the carrier beam via a lower support.

In some aspects, the techniques described herein relate to a spare wheel carrier, wherein the first hinge interface plane is spaced from the second hinge interface plane by 150 mm to 225 mm.

This summary is illustrative only and is not intended to be in any way limiting. Other aspects and advantages of the devices or processes described herein will become apparent in the detailed description set forth herein, taken in conjunction with the accompanying figures, wherein like reference numerals refer to like elements.

BRIEF DESCRIPTION OF DRAWINGS

The device is explained in even greater detail in the following drawings. The drawings are merely exemplary and certain features may be used singularly or in combination with other features. The drawings are not necessarily drawn to scale.

DETAILED DESCRIPTION

Figure 1:
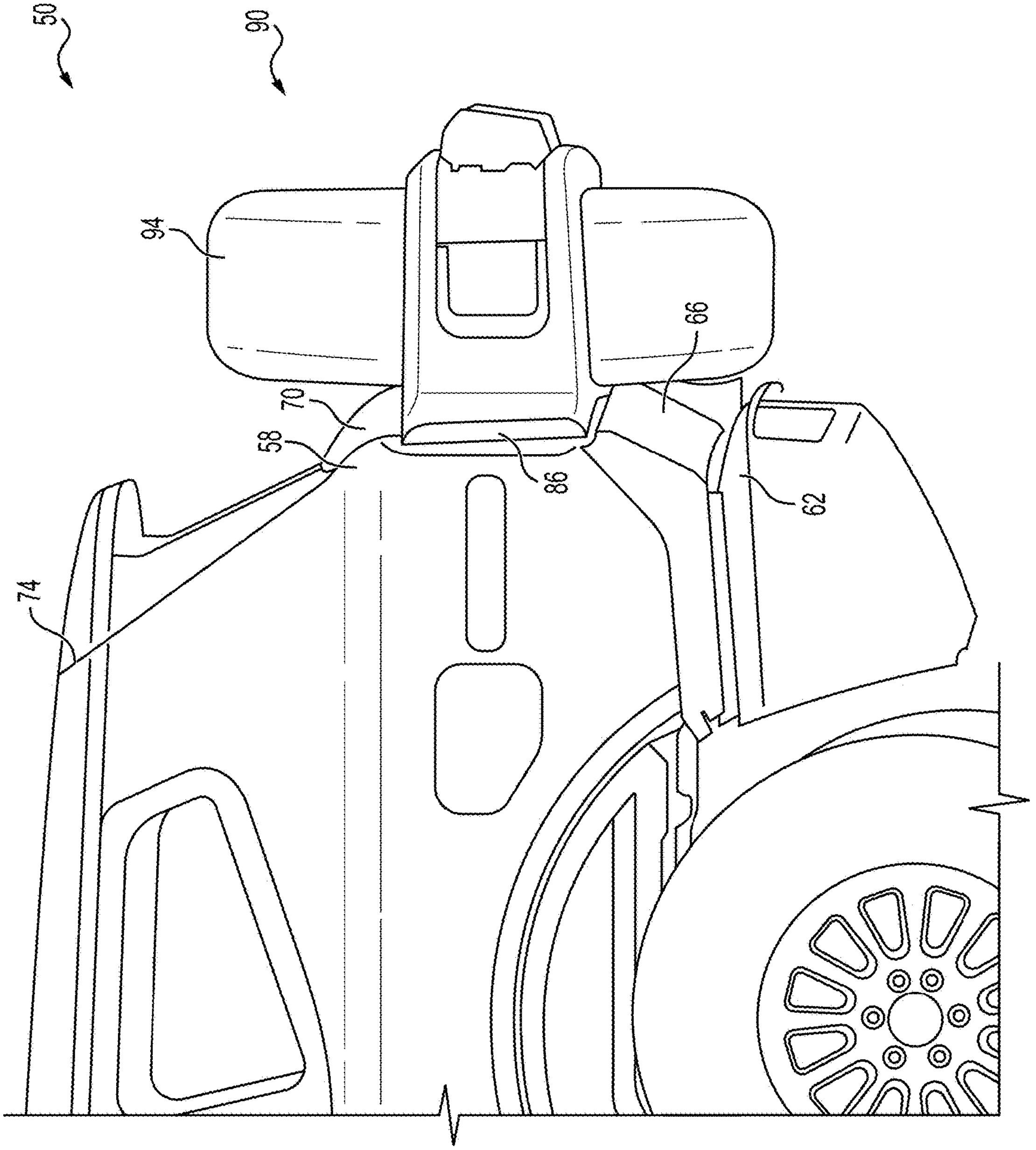
FIG. 1 is a left side view of a vehicle, according to some implementations.

Following below are more detailed descriptions of concepts related to, and implementations of, methods, apparatuses, and systems for a spare wheel carrier. The figures illustrate exemplary implementations in detail and the present disclosure is not limited to the details or methodology set forth in the description or illustrated in the figures. The terminology used herein is for the purpose of description only and should not be regarded as limiting.

Referring to the figures generally, the various implementations disclosed herein relate to systems, apparatuses, and methods for a spare wheel carrier for a vehicle. The vehicle includes a bench gate and a window gate, and the spare wheel carrier covers an interface seam defined between the bench gate and the window gate. The spare wheel carrier is coupled to a passenger side frame pillar with a hinge bracket. A latch system connects the spare wheel carrier to a driver's side frame pillar. A third support is provided on a lower frame member (e.g., a bumper support). The latch system, the hinge bracket, and the lower support provide a rigid and strong support system for the spare wheel carrier. The hinge bracket is substantially strong and allows a reduced height compared to typical swing away type spare wheel carriers. Additionally, a strut is positioned between hinge points and extends parallel to a ground plane.

As shown in FIGS. 1-4, a vehicle 50 includes a first rear pillar 54, a second rear pillar 58, and a lower frame member 62. In some implementations, the vehicle 50 is a sport-utility-vehicle (SUV). In some implementations, the first rear pillar 54 is a rear passenger side D-pillar and the second rear pillar 58 is a rear driver side D-pillar. In some implementations, the first rear pillar 54 and the second rear pillar 58 are structural support structures at a rearmost end of the vehicle 50. In some implementations, the lower frame member 62 is a crossbar of a vehicle frame. In some implementations, the lower frame member 62 is a bumper support of a unibody.

A bench gate 66 is connected to the lower frame member 62 with a hinge and is movable between a closed bench position (see FIGS. 1-4) and an open bench position (see FIG. 17) where the bench gate 66 is rotated down relative to the lower frame member 62 to provide access to a storage area of the vehicle 50. In some implementations, the bench gate 66 rotates parallel to a ground plane. A window gate 70 is positioned above the bench gate 66 and rotates upward relative to a roof 74 of the vehicle 50. In some implementations, the window gate 70 is supported by the roof 74 (e.g., a roof beam). The bench gate 66 and the window gate 70 meet at an interface seam 78 (see FIGS. 16 and 18). In some implementations, the window gate 70 rotates parallel to the ground plane.

A first rear light 82 is attached to the first rear pillar 54 and a second rear light 86 is attached to the second rear pillar 58.

Figure 16:
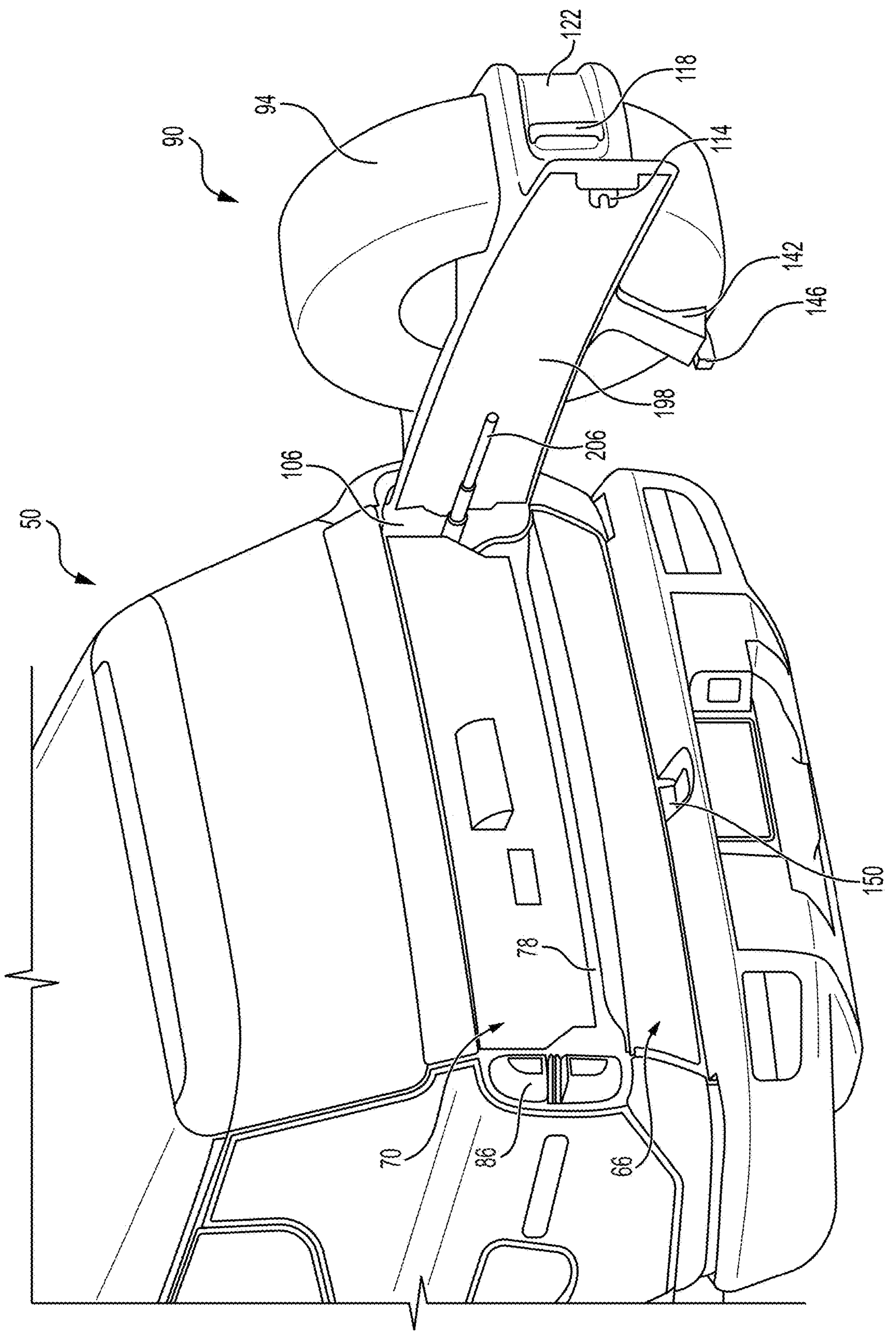
FIG. 16 is a perspective view of the spare wheel carrier of FIG. 5 in an open carrier position, and a bench gate and a window gate in a closed position, according to some implementations.
Figure 17:
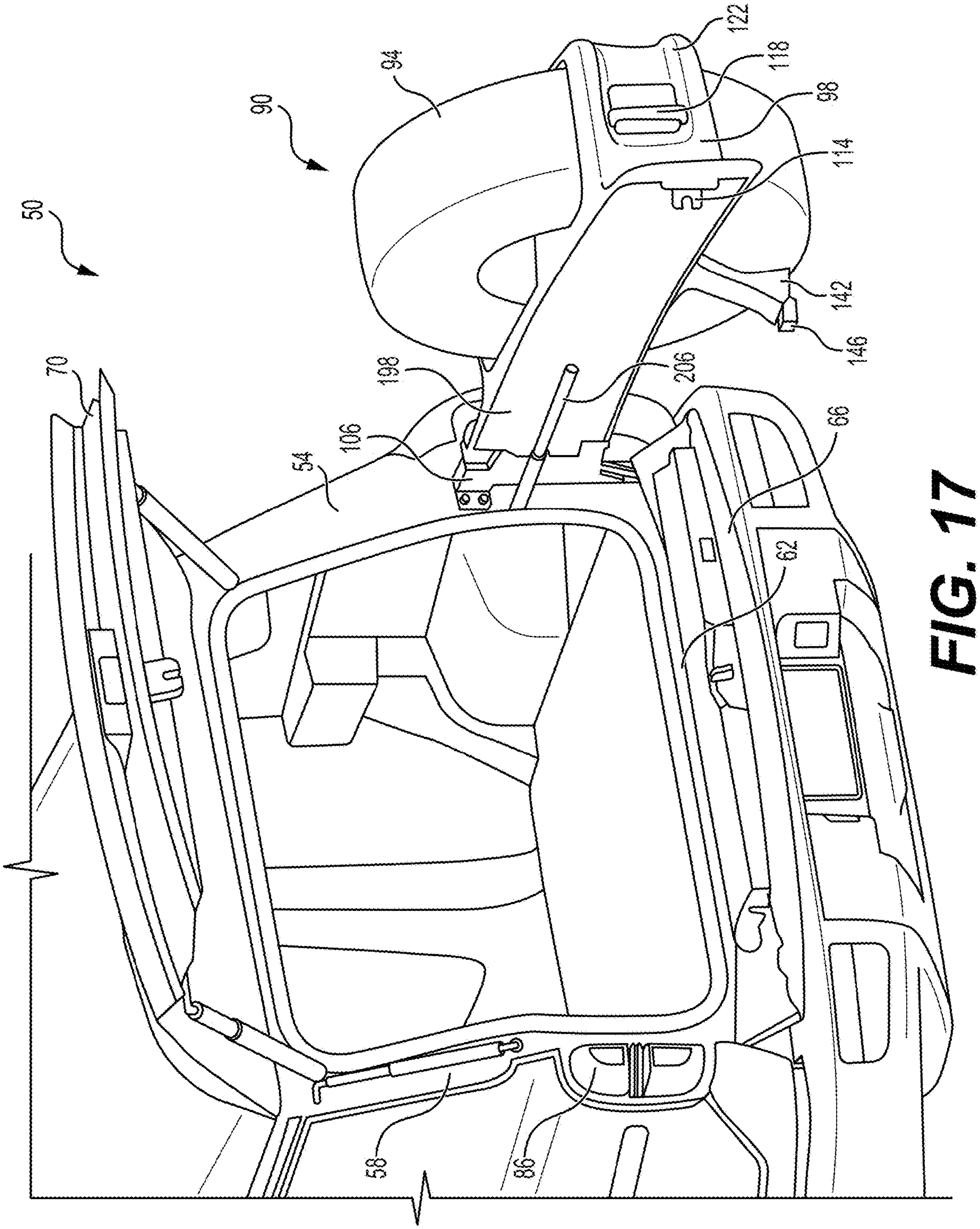
FIG. 17 is a top view of the spare wheel carrier of FIG. 5 in the open carrier position, and the bench gate and the window gate in an open position, according to some implementations.
Figure 18:
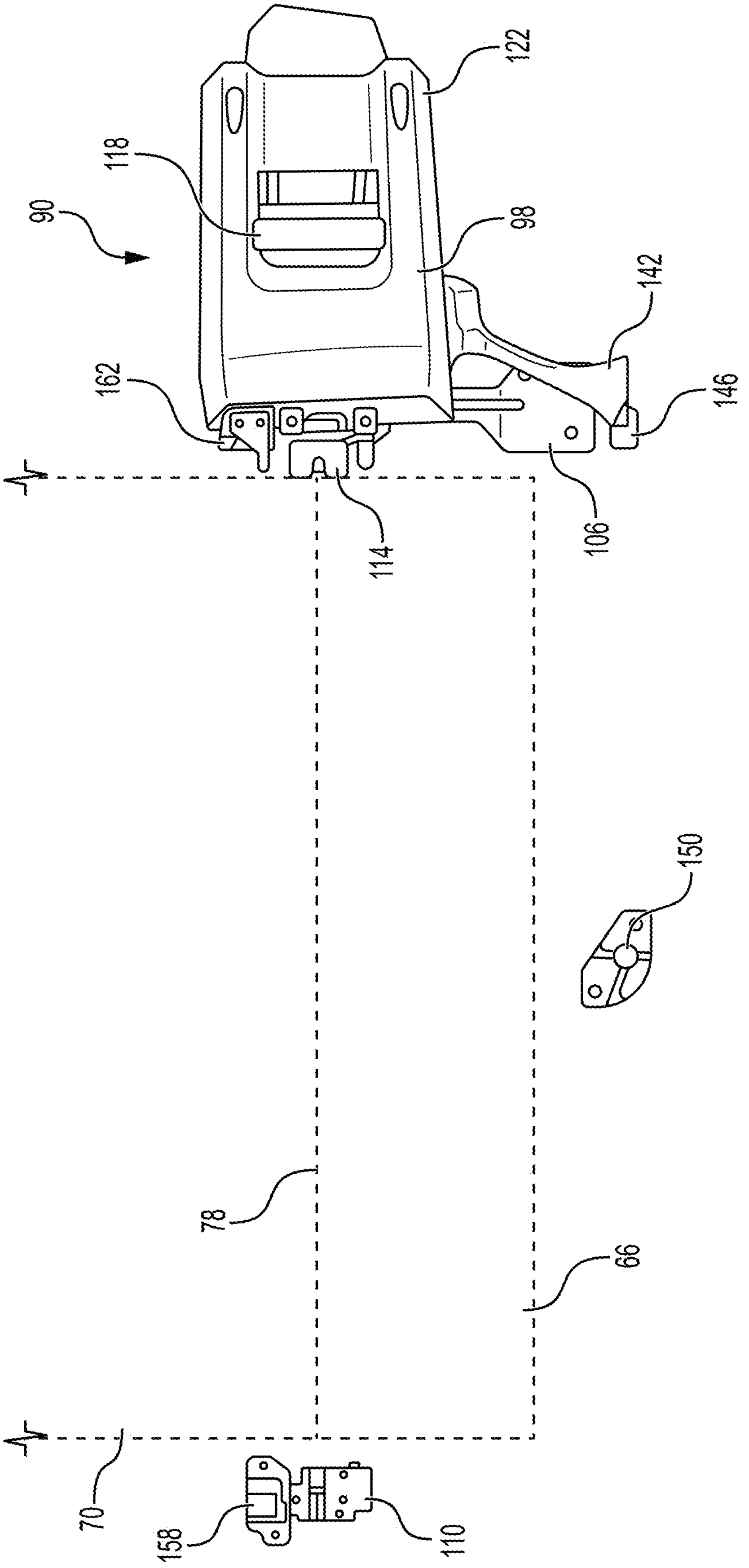
FIG. 18 is a rear view of the spare wheel carrier of FIG. 5 in the open position, according to some implementations.

A spare wheel carrier 90 is attached to the rear of the vehicle 50 and movable between a closed carrier position (see FIGS. 1-4) and an open carrier position (see FIGS. 16-18). The spare wheel carrier 90 is positioned between the first rear light 82 and the second rear light 86. In some implementations, the first rear light 82 and the second rear light 86 define inner surfaces toward a centerline of the vehicle 50 and the spare wheel carrier 90 is positioned entirely between the inner surfaces. The spare wheel carrier 90 covers or overlaps the interface seam 78 of the bench gate 66 and the window gate 70. The spare wheel carrier 90 supports a wheel 94 in both the open carrier position and the closed carrier position. As will be discussed below, the wheel 94 is removable from the spare wheel carrier 90 and usable as a spare wheel/tire.

Figure 2:
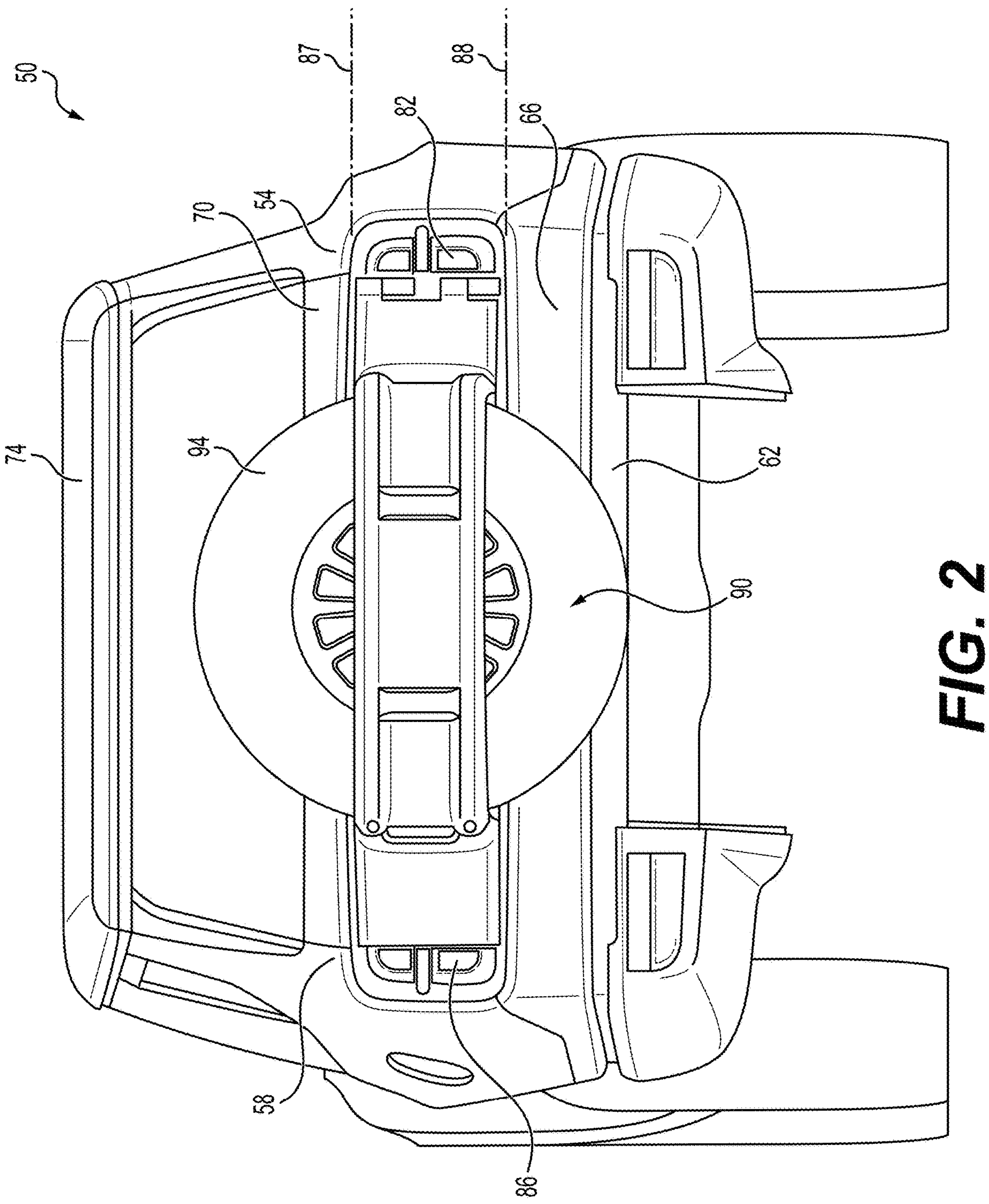
FIG. 2 is a rear view of vehicle of FIG. 1, according to some implementations.
Figure 3:
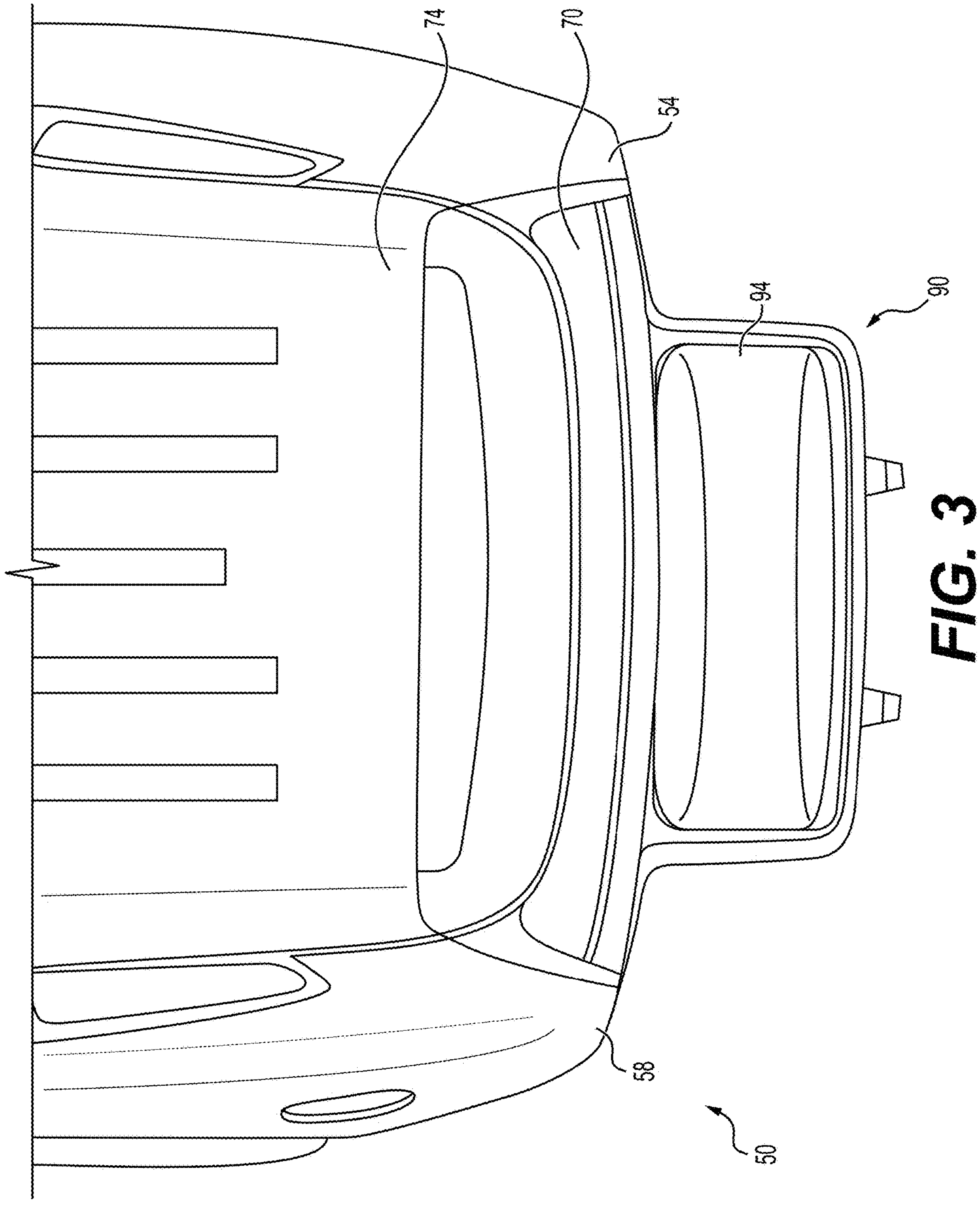
FIG. 3 is a top view of vehicle of FIG. 1, according to some implementations.
Figure 4:
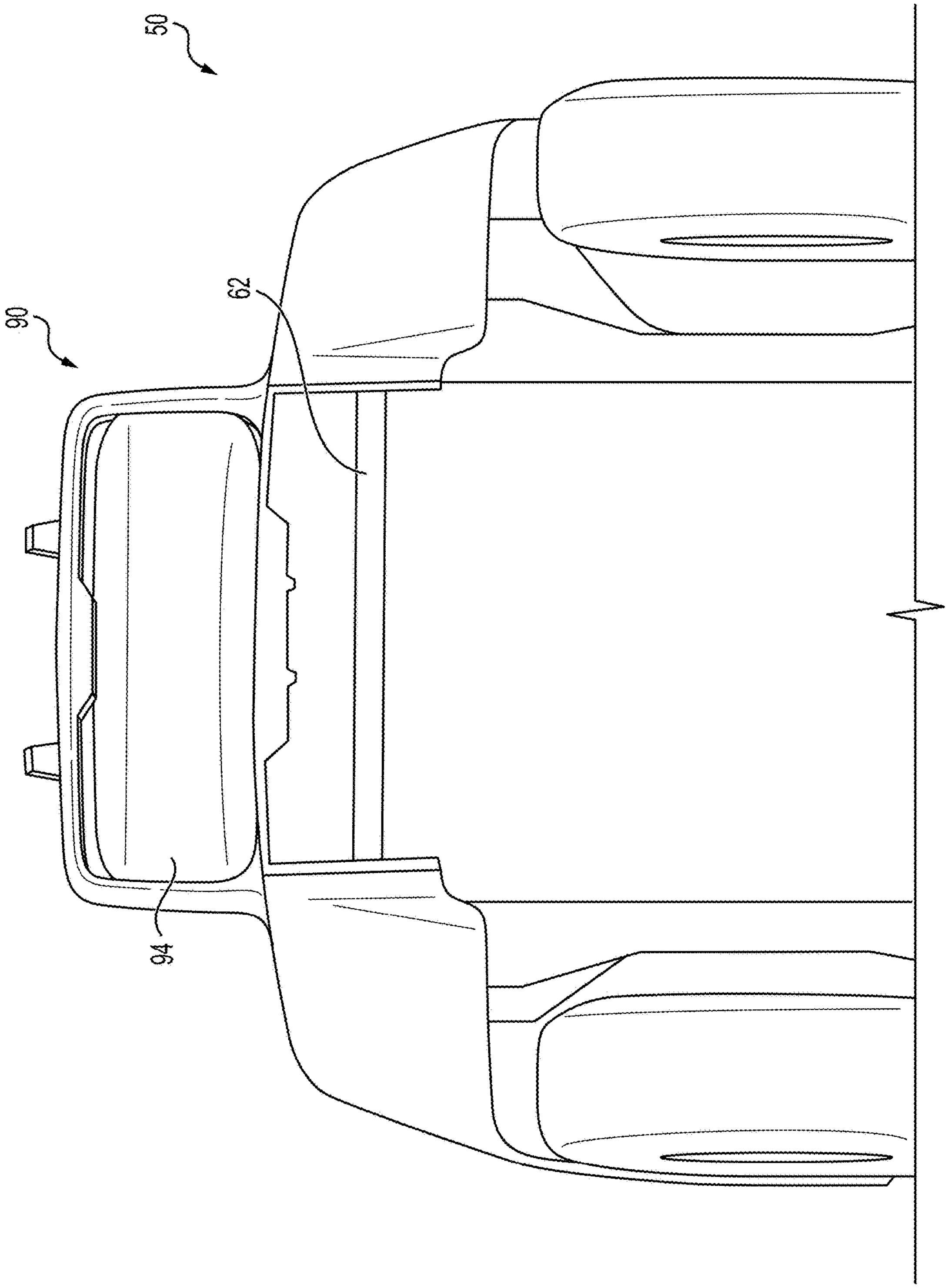
FIG. 4 is a bottom view of vehicle of FIG. 1, according to some implementations.

As shown in FIG. 2, the first rear light 82 and the second rear light 86 define an upper plane 87 at an upper extremity of the first rear light 82 and the second rear light 86 and a lower plane 88 at a lower extremity of the first rear light 82 and the second rear light 86. The upper plane 87 and the lower plane 88 are parallel to the ground plane. The spare wheel carrier 90 is arranged between the upper plane 87 and the lower plane 88. The first rear light 82, the second rear light 86, and the spare wheel carrier 90 form a continuous perimeter when viewed from the rear. In some implementations, a height between the upper plane 87 and the lower plane 88 is 200 mm to 400 mm. In some implementations, the height between the upper plane 87 and the lower plane 88 is 250 mm to 350 mm. In some implementations, the height between the upper plane 87 and the lower plane 88 is 300 mm.

Figure 5:
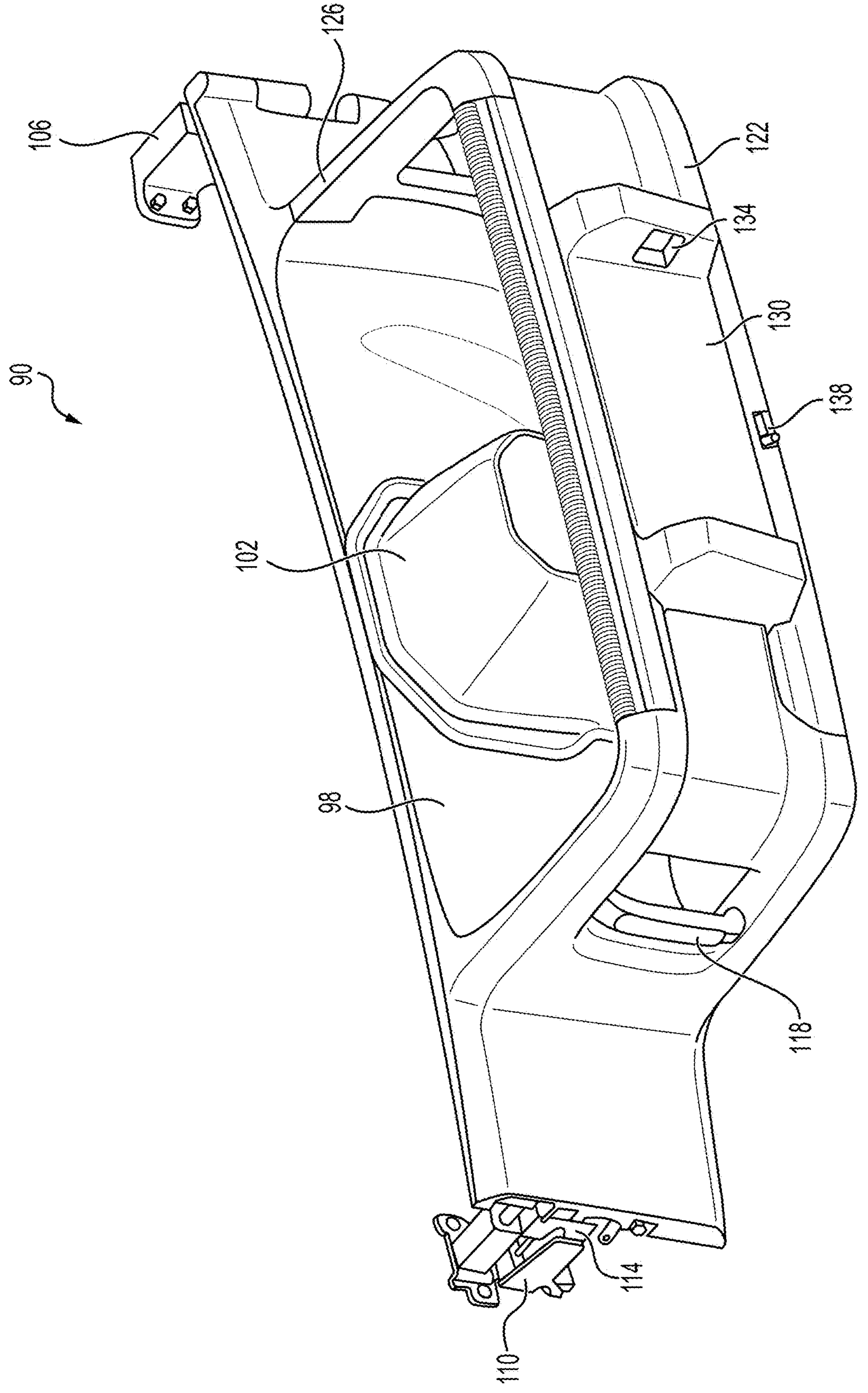
FIG. 5 is a perspective view of a spare wheel carrier of the vehicle of FIG. 1, according to some implementations.

As shown in FIG. 5, the spare wheel carrier 90 includes a carrier beam 98 having a wheel projection 102 sized to receive the wheel 94. In some implementations, the wheel projection 102 includes wheel studs sized to fasten to the wheel 94. The carrier beam 98 is supported by a hinge bracket 106 and rotates relative to the hinge bracket 106 between the open carrier position and the closed carrier position. The hinge bracket 106 is rigidly connected to the first rear pillar 54 via fasteners. A strike plate 110 is rigidly connected to the second rear pillar 58 and the spare wheel carrier 90 is selectively connected to the strike plate 110 via a latch 114 controlled by a handle 118. In some implementations, the handle 118 actuates the latch 114 via an actuator cable that extends through a cavity formed in the carrier beam 98. In some implementations, the handle 118 includes a button or another electronic sensor (e.g., a motion sensor, a touch sensor, etc.) that communicates with an electric actuator in the latch 114 to actuate between a locked position and an unlocked position. When the latch 114 is arranged in the unlocked position, the spare wheel carrier 90 can be freely rotated on the hinge bracket 106 between the open carrier position and the closed carrier position.

Figure 15:
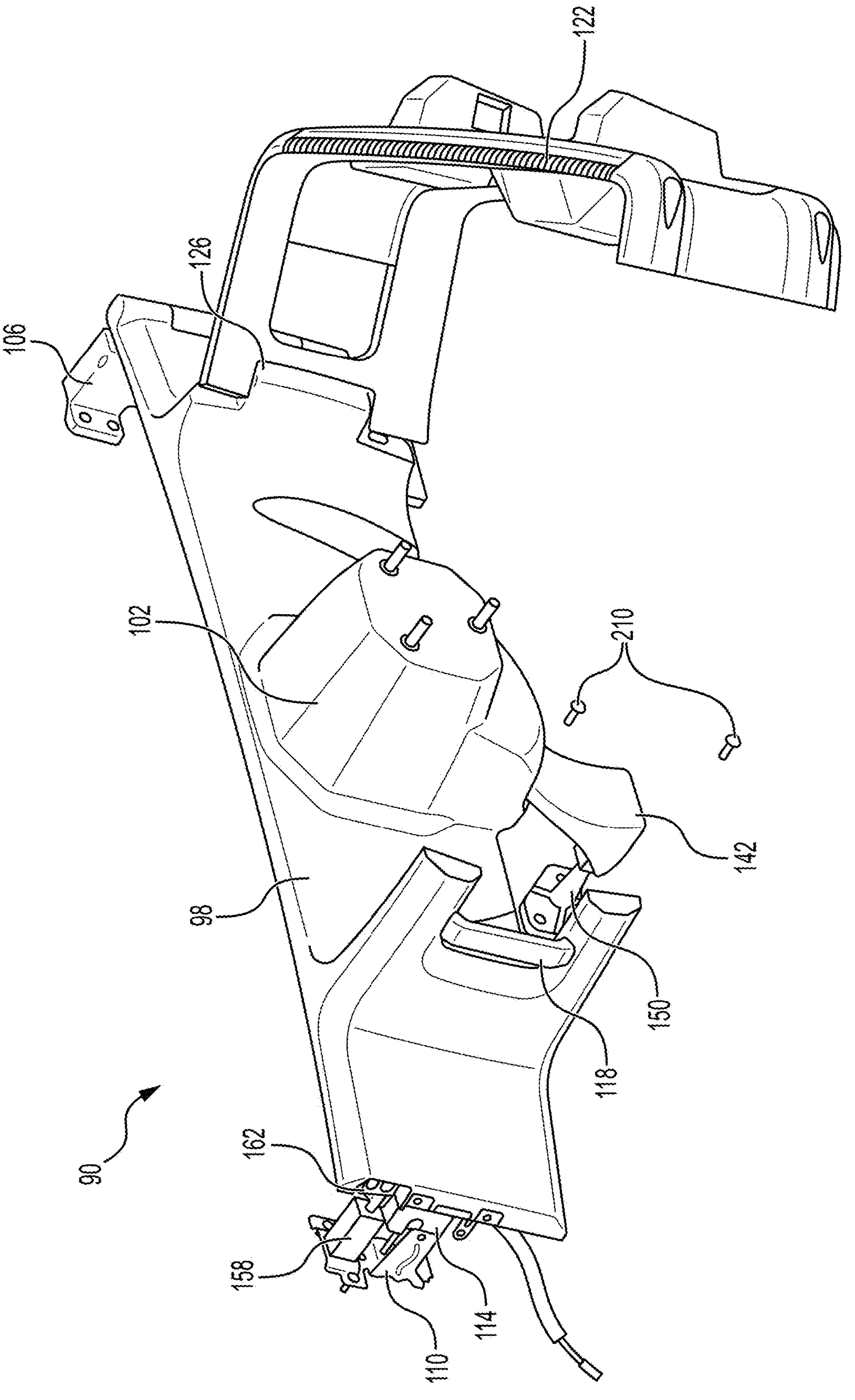
FIG. 15 is a perspective view of the spare wheel carrier of FIG. 5 in a wheel access position, according to some implementations.

A wheel cover 122 is connected to the carrier beam 98 by a cover hinge 126 and is movable between a wheel captured position (see FIG. 5) and a wheel access position (see FIG. 15). In some implementations, the wheel cover 122 includes a license plate mount 130 shaped to hold license plate lights 134. In some implementations, the wheel cover 122 also includes a location to mount a reverse camera 138 or other vehicle sensors. The wheel cover 122 extends out from the rear of the vehicle 50 and therefore the reverse camera 138 is positioned to provide a wide view of a space behind the vehicle 50.

Figure 6:
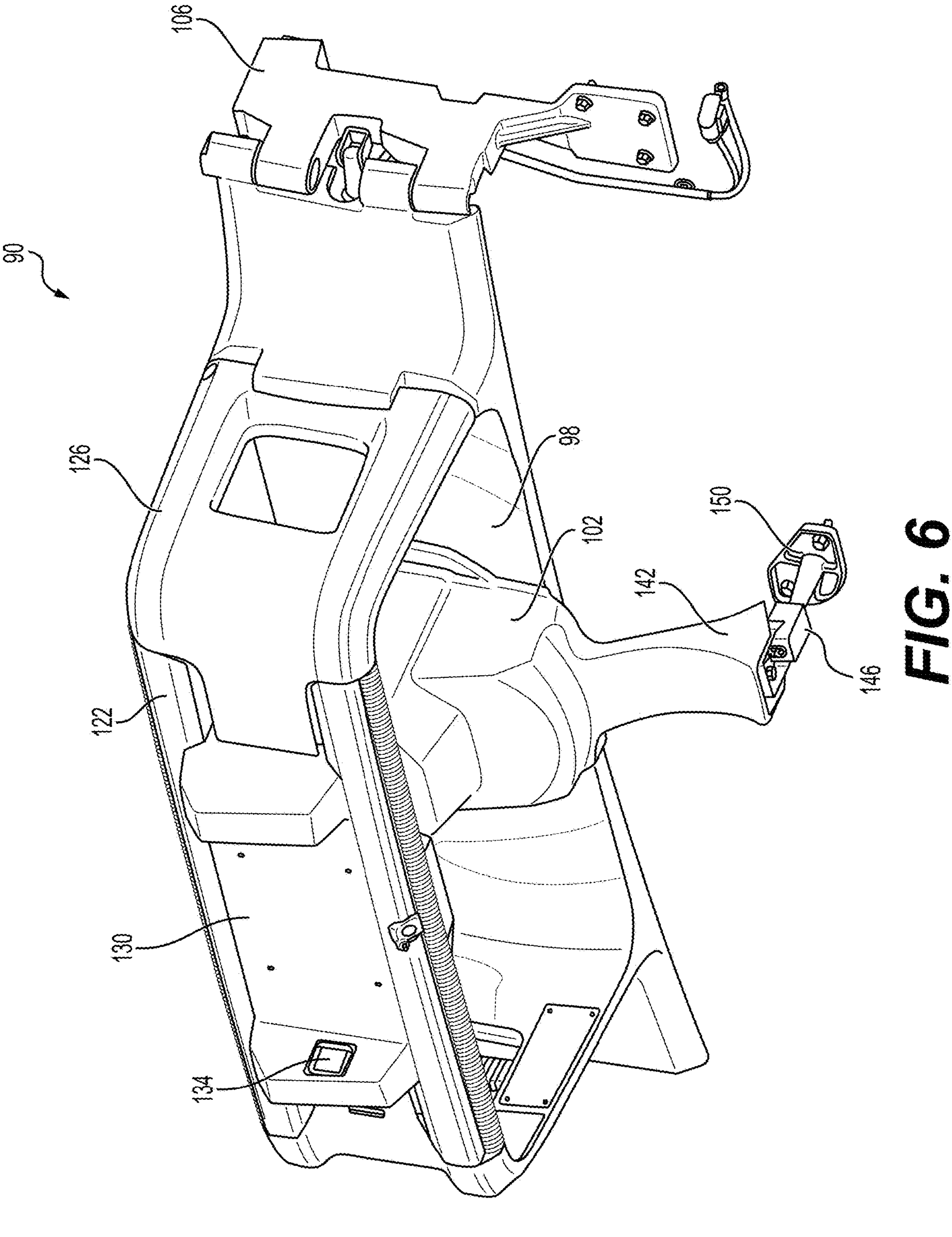
FIG. 6 is another perspective view of the spare wheel carrier of FIG. 5, according to some implementations.

As shown in FIG. 6, the carrier beam 98 includes a carrier lower support 142 that extends downward and a gate lower support in the form of a lower support receiver 146 connected to the lower support 142. The lower support receiver 146 is sized to receive a frame lower support in the form of a lower support pin 150 that is supported by the lower frame member 62. In some implementations, the lower support pin 150 is fastened to the lower frame member 62.

Figure 7:
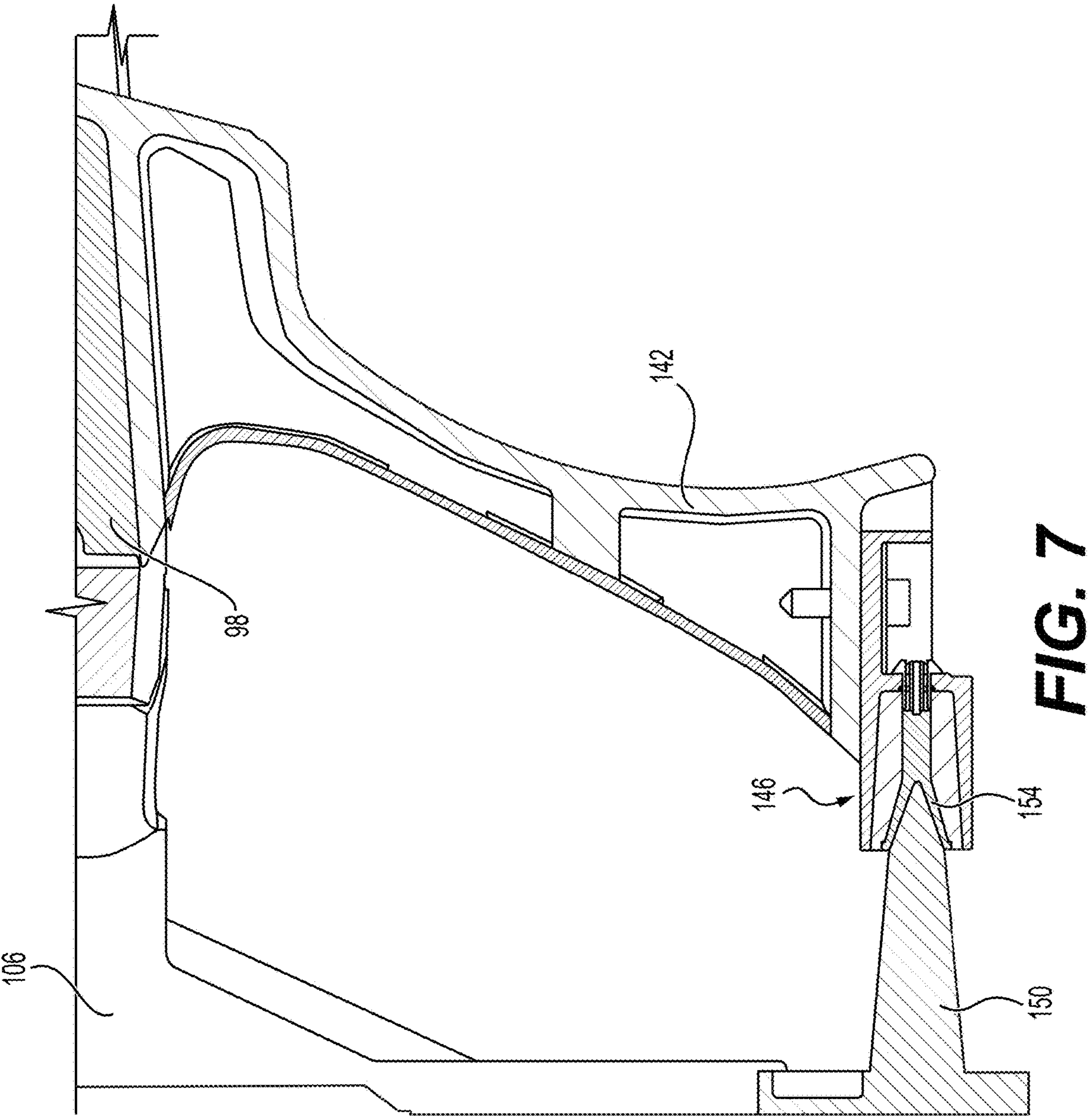
FIG. 7 is a section view of the spare wheel carrier of FIG. 5 showing a lower support, according to some implementations.

As shown in FIG. 7, the lower support receiver 146 includes an elastomeric inner sleeve 154 that compliantly receives the lower support pin 150. The lower support pin 150 and the lower support receiver 146 are positioned so that when the spare wheel carrier 90 in in the closed carrier position, the lower support receiver 146 is preloaded or biased away from the vehicle 50 (to the right in FIG. 7). In some implementations, the preload is less than 100 N of preload. In some implementations, the elastomeric inner sleeve 154 engages the lower support pin 150 2 mm to 6 mm before the closed carrier position is reached. In other words, in some implementations, the preload is 2 mm to 6 mm in length. The preloading of the lower support receiver 146 is transferred to the carrier beam 98 via the lower support 142 and provides improved alignment and stability of the spare wheel carrier 90 while loaded with the wheel 94 and while experiencing road loads and vibration. In other words, the preload counteracts the moment imparted by the weight of the wheel 94 on the spare wheel carrier 90.

Figure 8:
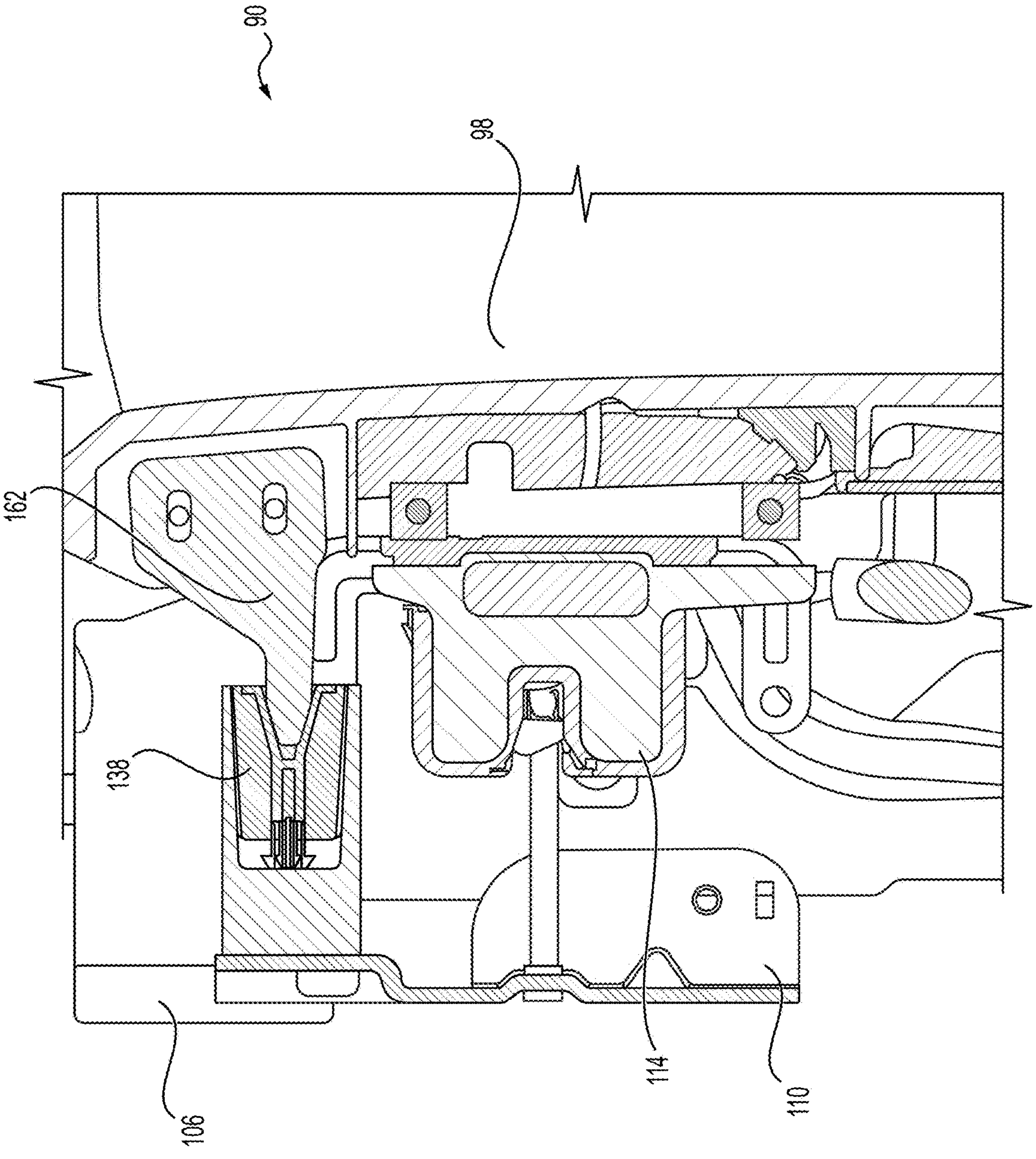
FIG. 8 is a section view of the spare wheel carrier of FIG. 5 showing a latch assembly, according to some implementations.

As shown in FIG. 8, the latch 114 engages the strike plate 110. The strike plate 110 also includes a strike plate receiver 158 sized to receive a latch pin 162 fastened to the carrier beam 98. The strike plate receiver 158 and latch pin 162 are similar to the lower support receiver 146 and lower support pin 150 discussed above and solidify the support provided to the spare wheel carrier 90 when in the closed carrier position. In some implementations, the latch 114 inhibits movement of the spare wheel carrier 90 out of the closed carrier position, and engagement of the latch pin 162 with the strike plate receiver 158 supports the load.

Figure 9:
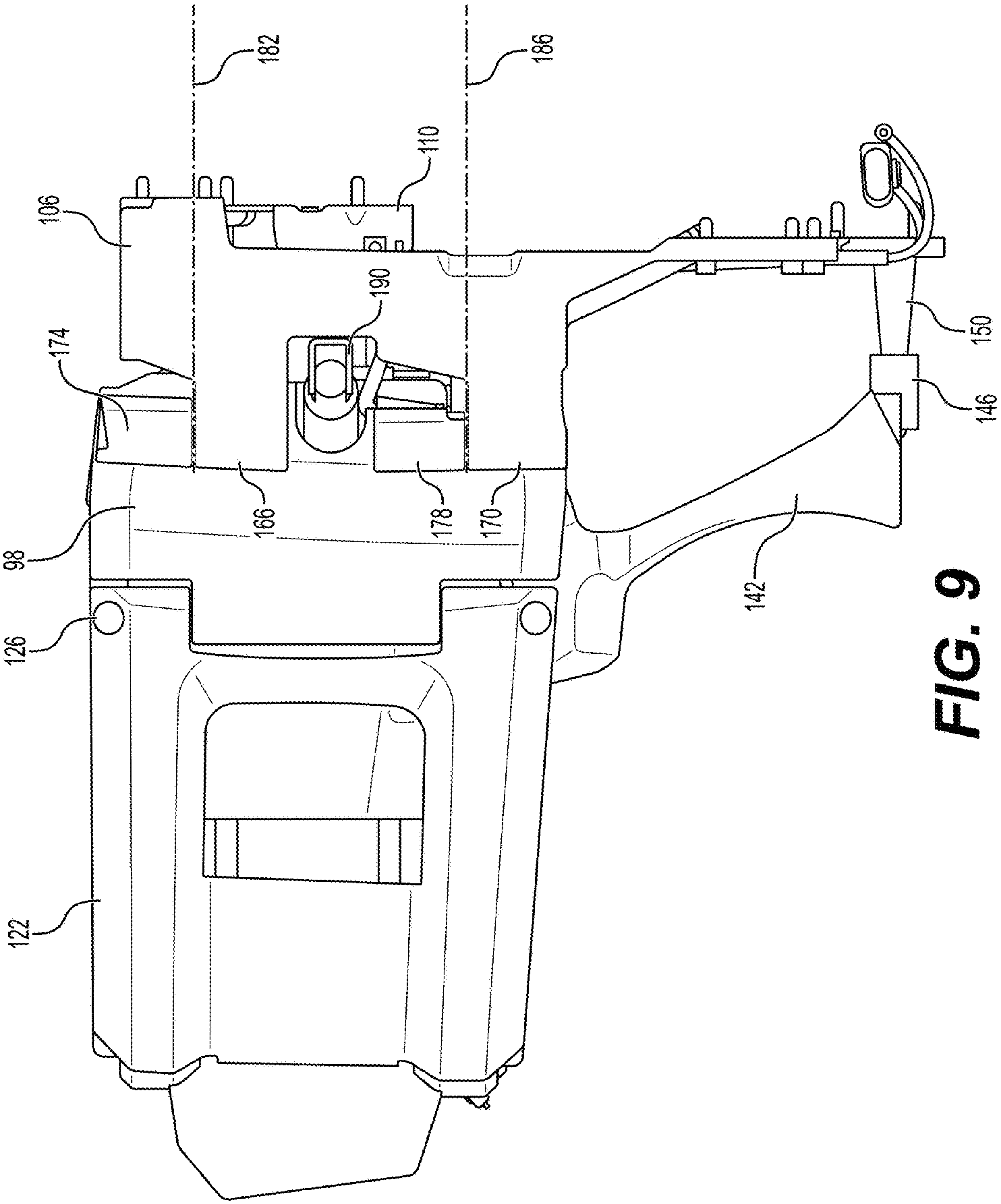
FIG. 9 is a right side view of the spare wheel carrier of FIG. 5, according to some implementations.

As shown in FIG. 9, the hinge bracket 106 includes a first bracket hinge stud 166 and a second bracket hinge stud 170 that are shaped to engage a first carrier hinge stud 174 and a second carrier hinge stud 178. The first bracket hinge stud 166 and the first carrier hinge stud 174 define a first hinge interface plane 182 that extends parallel to the ground plane. The second bracket hinge stud 170 and the second carrier hinge stud 178 define a second hinge interface plane 186 that extends parallel to the ground plane. In some implementations, the interface seam 78 is positioned below the first hinge interface plane 182. The hinge bracket 106 also includes a bracket strut mount 190 that is positioned between the first hinge interface plane 182 and the second hinge interface plane 186. In some implementations, the first hinge interface plane 182 is spaced from the second hinge interface plane 186 by 150 mm to 225 mm. In some implementations, the bracket strut mount 190 is a separate bracket that is fastened to the hinge bracket 106. In some implementations, the first carrier hinge stud 174 rests on the first bracket hinge stud 166 or is supported by the first bracket hinge stud 166. In some implementations, the second carrier hinge stud 178 rests on the second bracket hinge stud 170 or is supported by the second bracket hinge stud 170.

Figure 10:
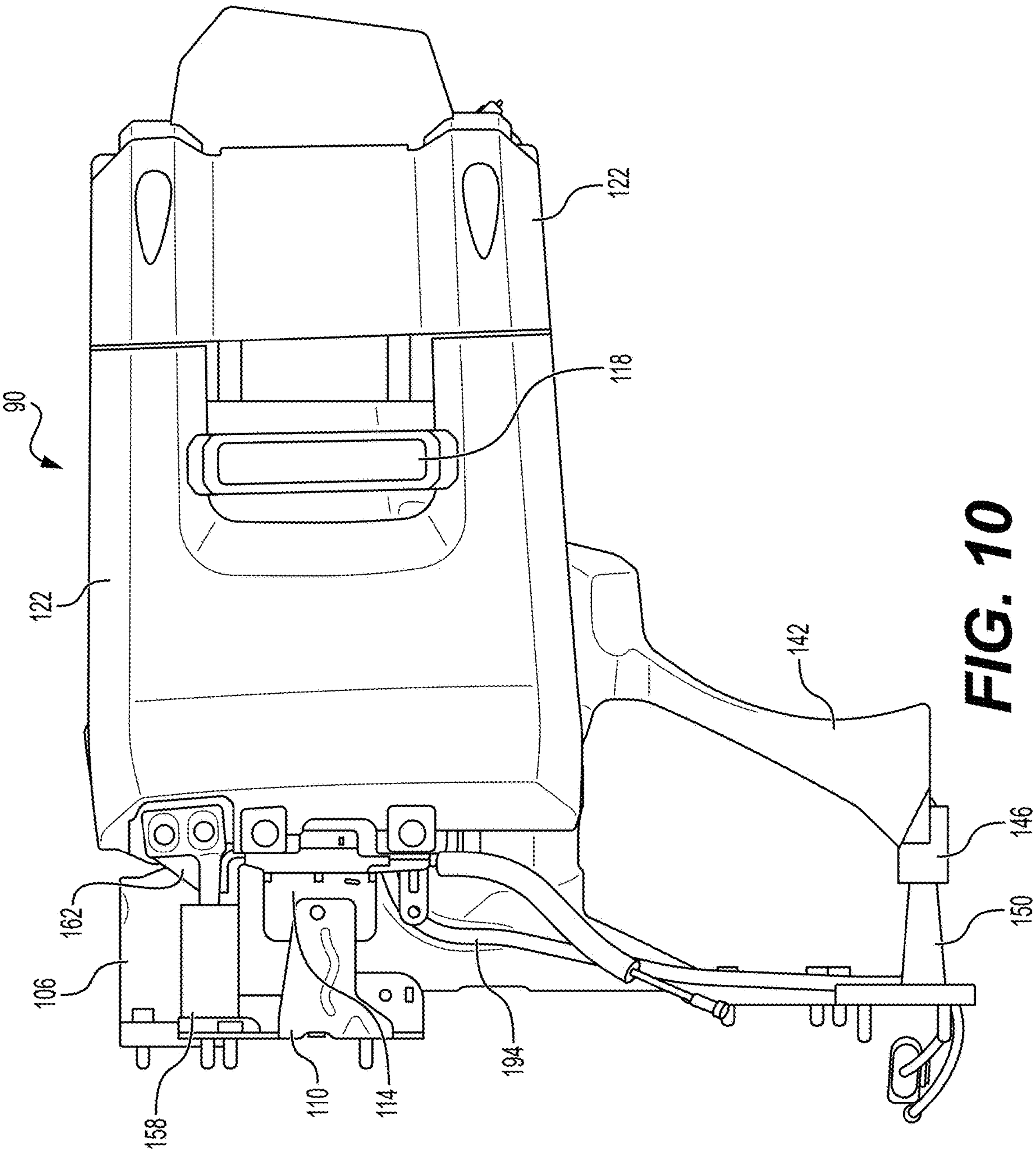
FIG. 10 is a left side view of the spare wheel carrier of FIG. 5, according to some implementations.
Figure 11:
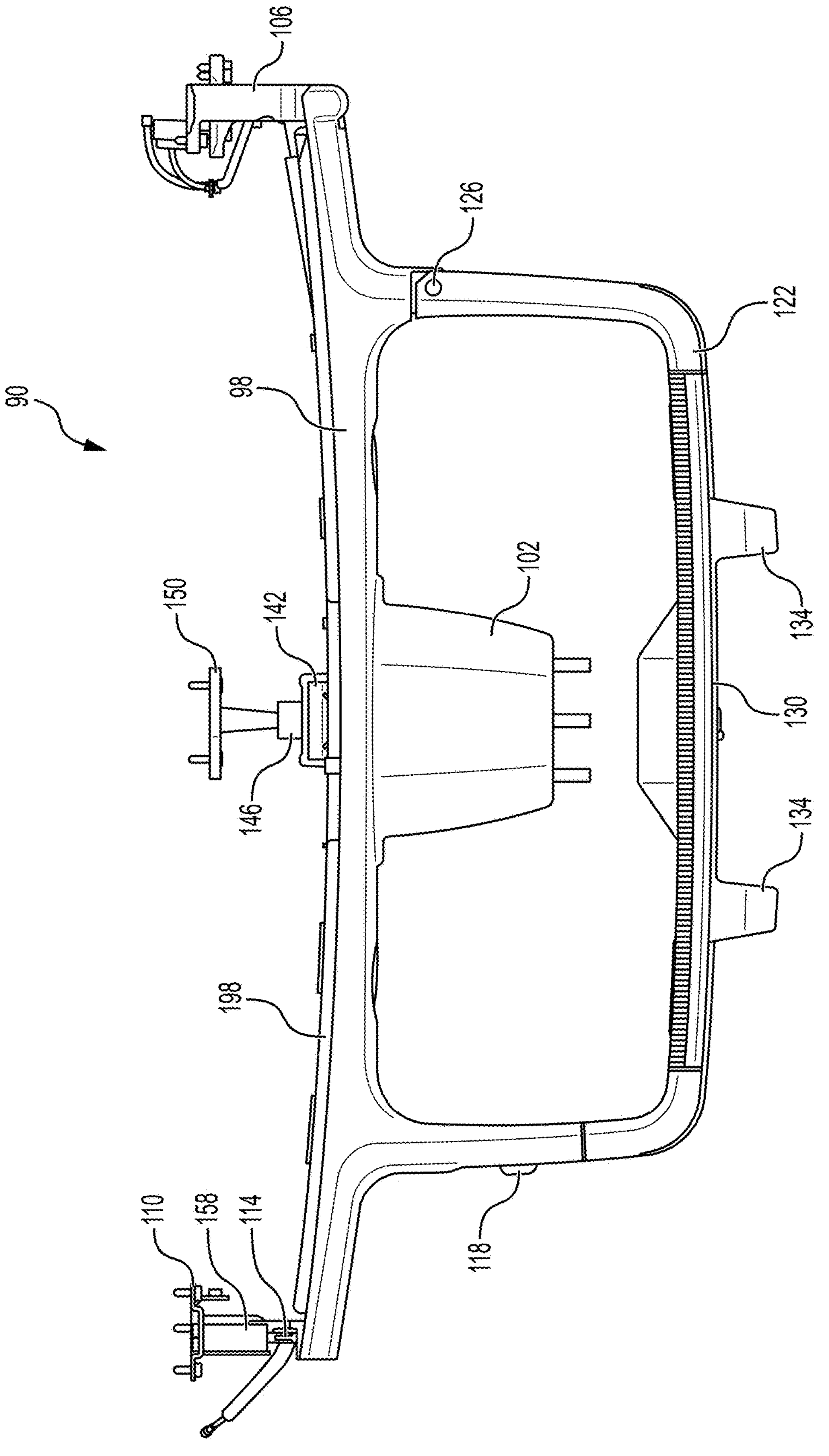
FIG. 11 is a top view of the spare wheel carrier of FIG. 5, according to some implementations.
Figure 12:
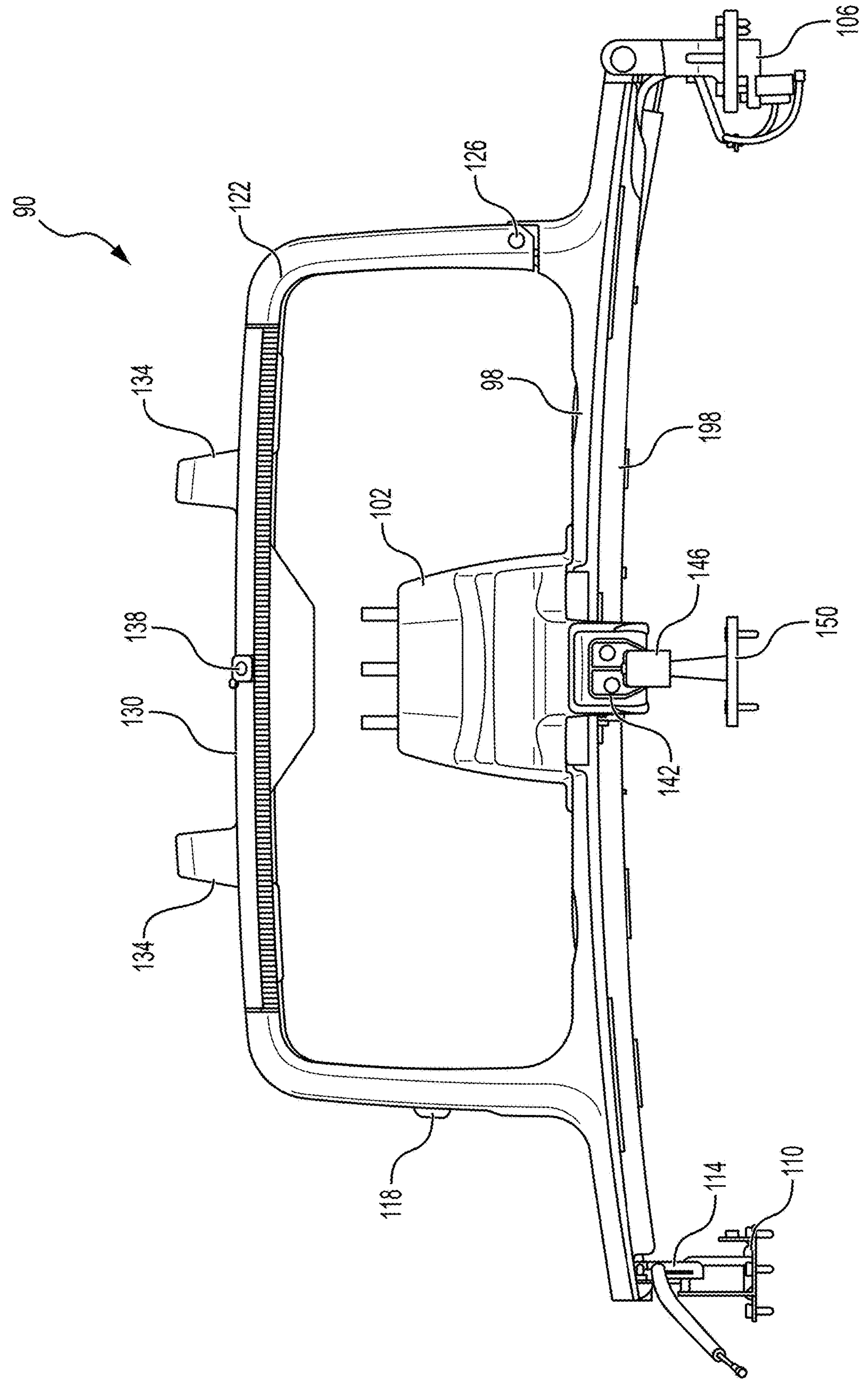
FIG. 12 is a bottom view of the spare wheel carrier of FIG. 5, according to some implementations.
Figure 13:
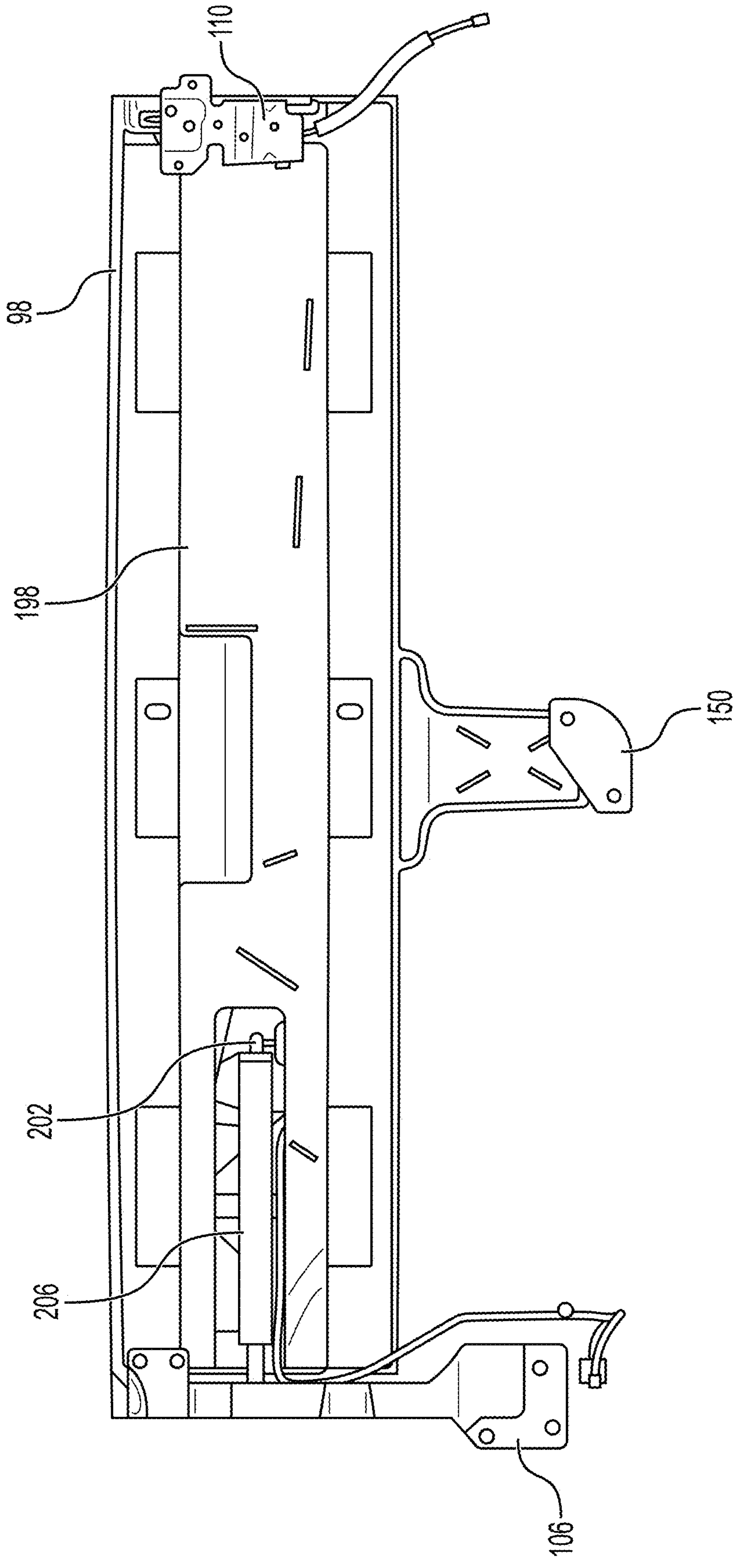
FIG. 13 is a front view of the spare wheel carrier of FIG. 5, according to some implementations.
Figure 14:
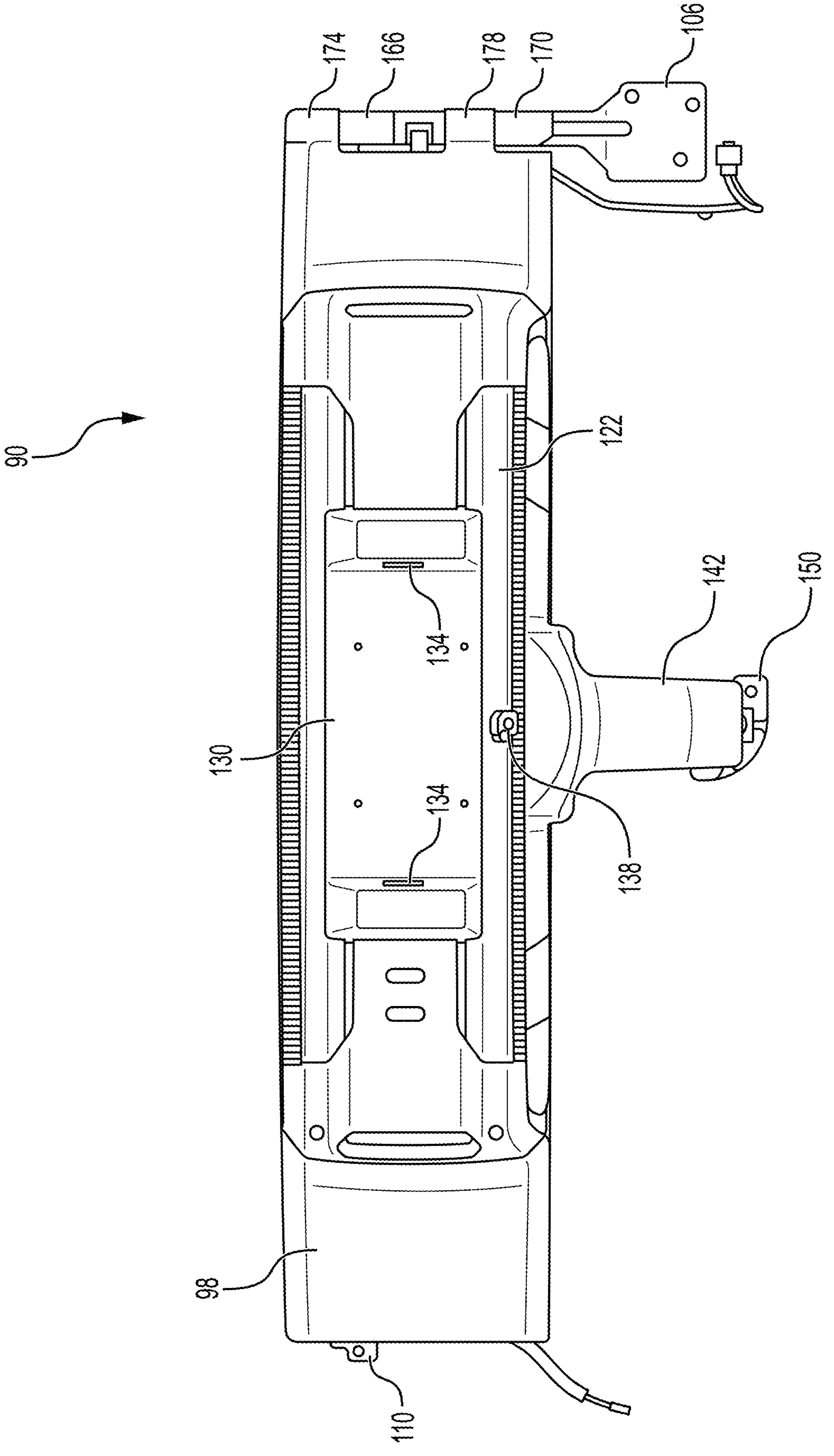
FIG. 14 is a rear view of the spare wheel carrier of FIG. 5, according to some implementations.

As shown in FIG. 10, the hinge bracket 106 includes a cable channel 194 that provides a conduit for wires and cables to pass between the spare wheel carrier 90 and the vehicle 50.

As shown in FIGS. 11-14, the carrier beam 98 includes a rear panel 198 that adds to the rigidity of the carrier beam 98. The carrier beam 98 also includes a carrier strut mount 202. A strut 206 extends between the bracket strut mount 190 and the carrier strut mount 202. The strut 206 provides support and damping to the movement of the carrier beam 98 relative to the vehicle 50. Additionally, the strut 206 helps to hold the spare wheel carrier 90 in place when used on a hill or incline. In some implementations, the spare wheel carrier 90 can include a detent (e.g., on the hinge bracket 106) to help hold the spare wheel carrier in the open carrier position. The strut 206 is positioned between the first hinge interface plane 182 and the second hinge interface plane 186. In some implementations, the strut 206 is positioned between the upper plane 87 of the first rear light 82 and the lower plane 88 of the first rear light 82.

As shown in FIG. 15, the wheel cover 122 is connected to the carrier beam 98 by two fasteners 210. When the fasteners 210 are engaged with the wheel cover 122 and the carrier beam 98, the wheel cover 122 is inhibited from moving from the wheel captured position to the wheel access position. When a user desires to use the wheel 94, the two fasteners 210 are removed, and the wheel cover 122 is free to move to the wheel access position via rotation on the cover hinge 126. In some implementations, the cover hinge 126 is eliminated and the wheel cover 122 is fastened to the carrier beam 98 at both ends.

As shown in FIGS. 16-18, the spare wheel carrier 90 can be arranged in the open carrier position to provide access to the bench gate 66 and the window gate 70 by exposing the interface seam 78. Once the spare wheel carrier 90 is arranged in the carrier open position, the bench gate 66 and the window gate 70 are free to move to their respective open positions to provide access to a storage area of the vehicle 50 or for other uses (e.g., to use the bench gate 66 as a seat or tailgate. The interface seam 78 and the strut 206 are positioned between the first hinge interface plane 182 and the second hinge interface plane 186. In some implementations, the interface seam 78 and the strut 206 are positioned between the upper plane 87 of the first rear light 82 and the lower plane 88 of the first rear light 82.

Figure 19:
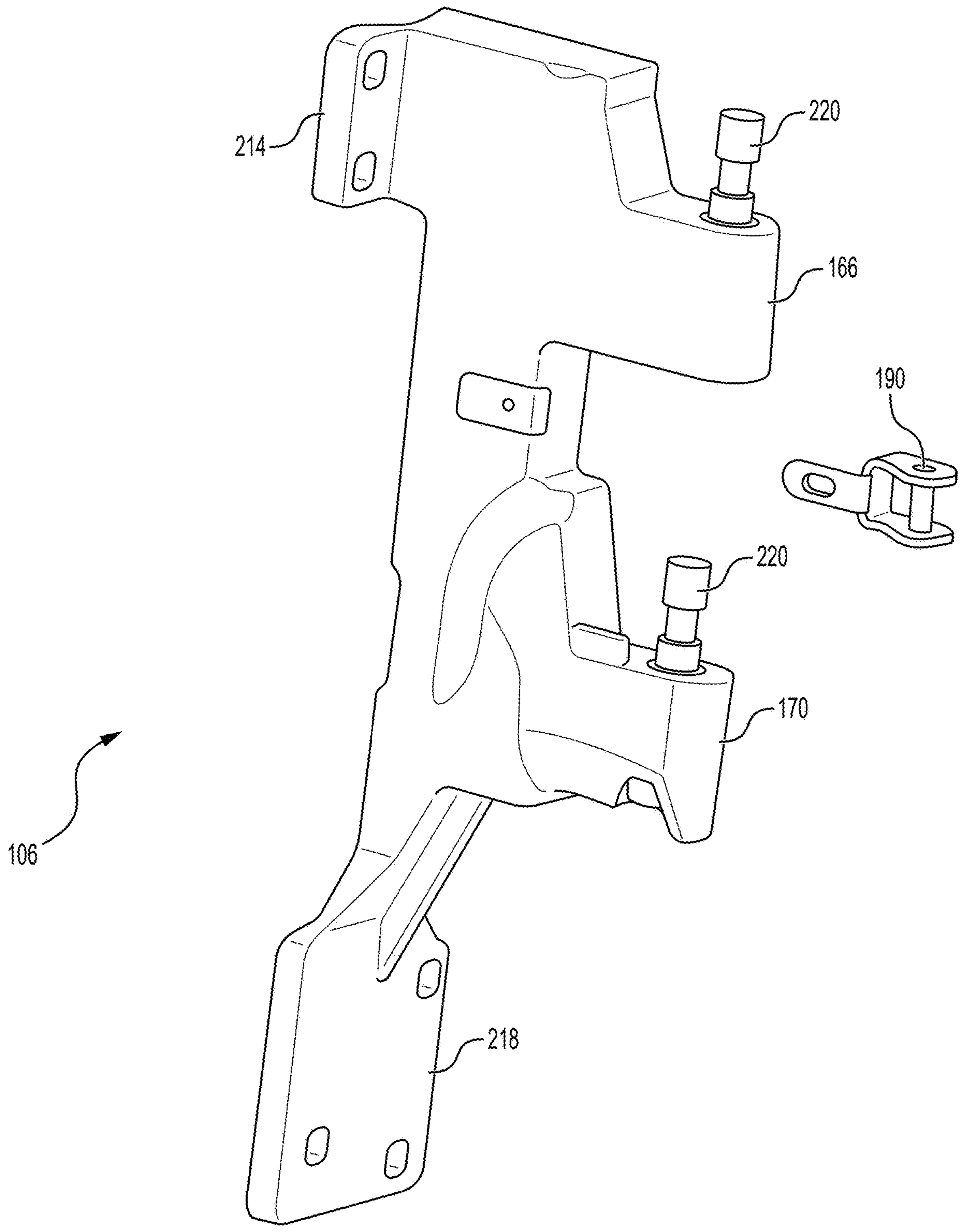
FIG. 19 is a perspective view of a hinge bracket of the spare wheel carrier of FIG. 5, according to some implementations.

As shown in FIG. 19, the hinge bracket 106 includes an upper bracket pad 214 shaped to engage the first rear pillar 54 and a lower bracket pad 218 shaped to engage the first rear pillar 54. The first bracket hinge stud 166 and the second bracket hinge stud 170 are positioned between the upper bracket pad 214 and the lower bracket pad 218. In some implementations, the upper bracket pad 214 and the lower bracket pad 218 are shaped and positioned to engage the first rear pillar 54 behind a taillight of the vehicle 50. In some implementations, the upper bracket pad 214 and the lower bracket pad 218 engage the first rear pillar 54 behind a body panel of the vehicle 50. In some implementations, the upper bracket pad 214 and the lower bracket pad 218 are substantially hidden from view after installation.

Figure 20:
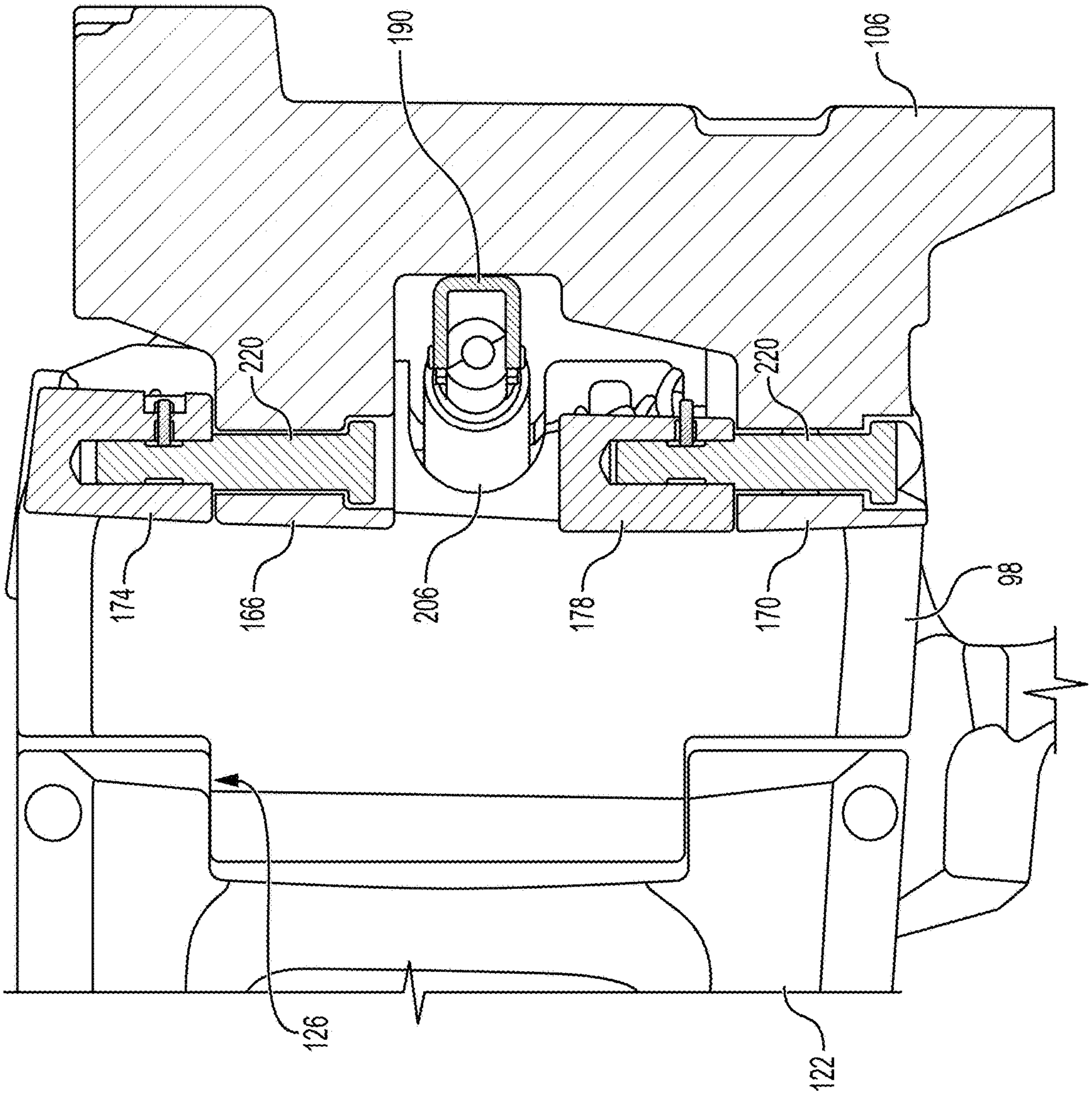
FIG. 20 is a section view of the spare wheel carrier of FIG. 5 showing the hinge bracket, according to some implementations.

As shown in FIG. 20, the first carrier hinge stud 174 is maintained in rotating engagement with the first bracket hinge stud 166 and the second carrier hinge stud 178 is maintained in rotating engagement with the second bracket hinge stud 170 via hinge pins 220. In some implementations, the hinge pins 220 are formed as a part of the first bracket hinge stud 166 and the second bracket hinge stud 170. In some implementations, the first carrier hinge stud 174 and the second carrier hinge stud 178 are maintained in engagement with the hinge pins 220 via set screws. In some implementations, the first carrier hinge stud 174 and the second carrier hinge stud 178 are maintained in engagement with the hinge pins 220 via a top drive bolt, or another arrangement.

Figure 21:
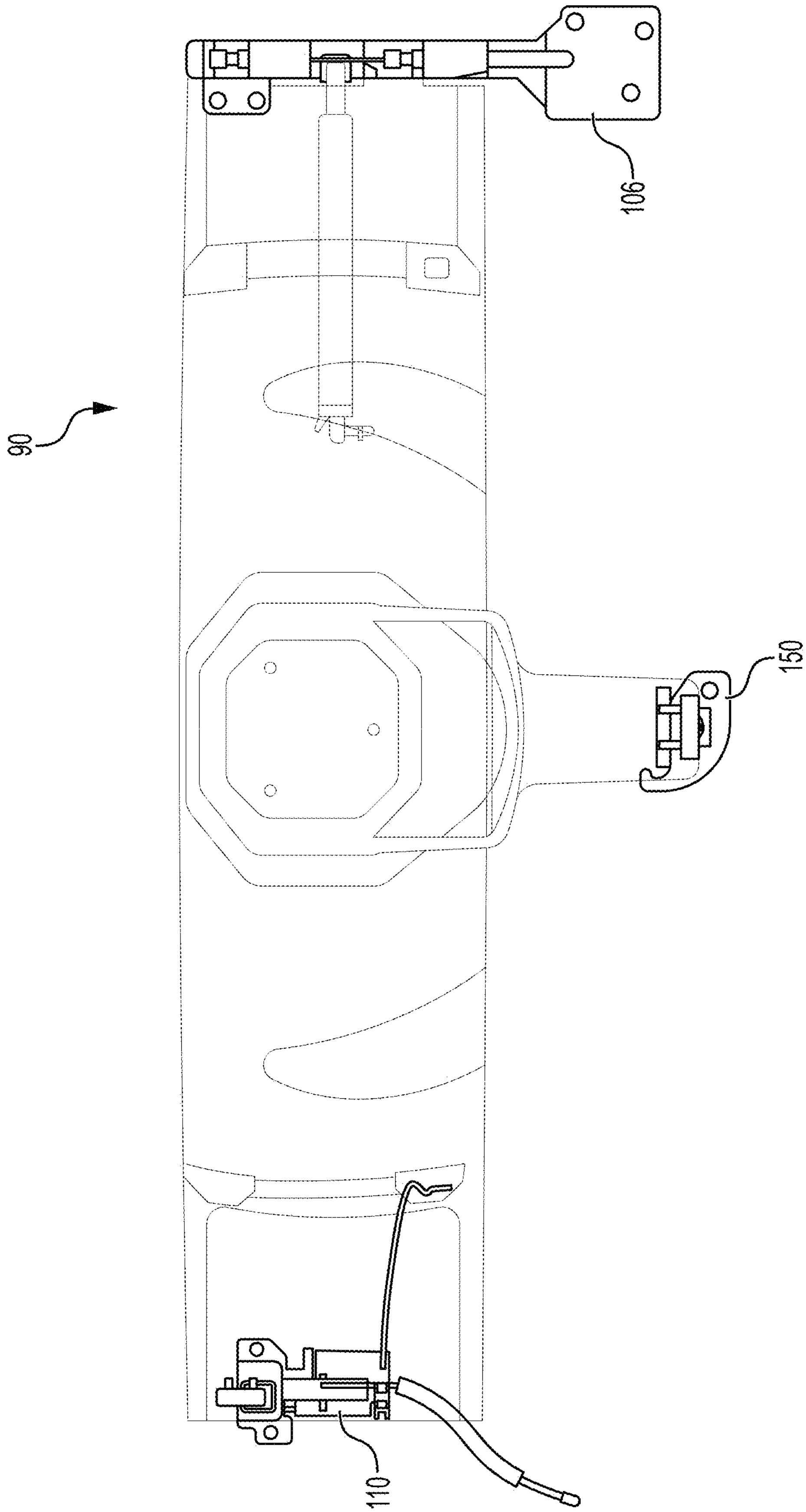
FIG. 21 is a rear view of three attachment points of the spare wheel carrier of FIG. 5, according to some implementations.

As shown in FIG. 21, the spare wheel carrier 90 is supported by the vehicle 50 at three points: the strike plate 110, the lower support pin 150, and the hinge bracket 106. The three points of contact and support provide a strong load bearing structure that resists deflection. Additionally, the preload on the lower support pin 150 (provided by the lower support receiver 146) increases the rigidity of the spare wheel carrier 90. In some implementations, the lower support pin 150 is separated from the latch pin 162 of the latch 114 by a vertical distance of 250 mm to 350 mm.

Figure 22:
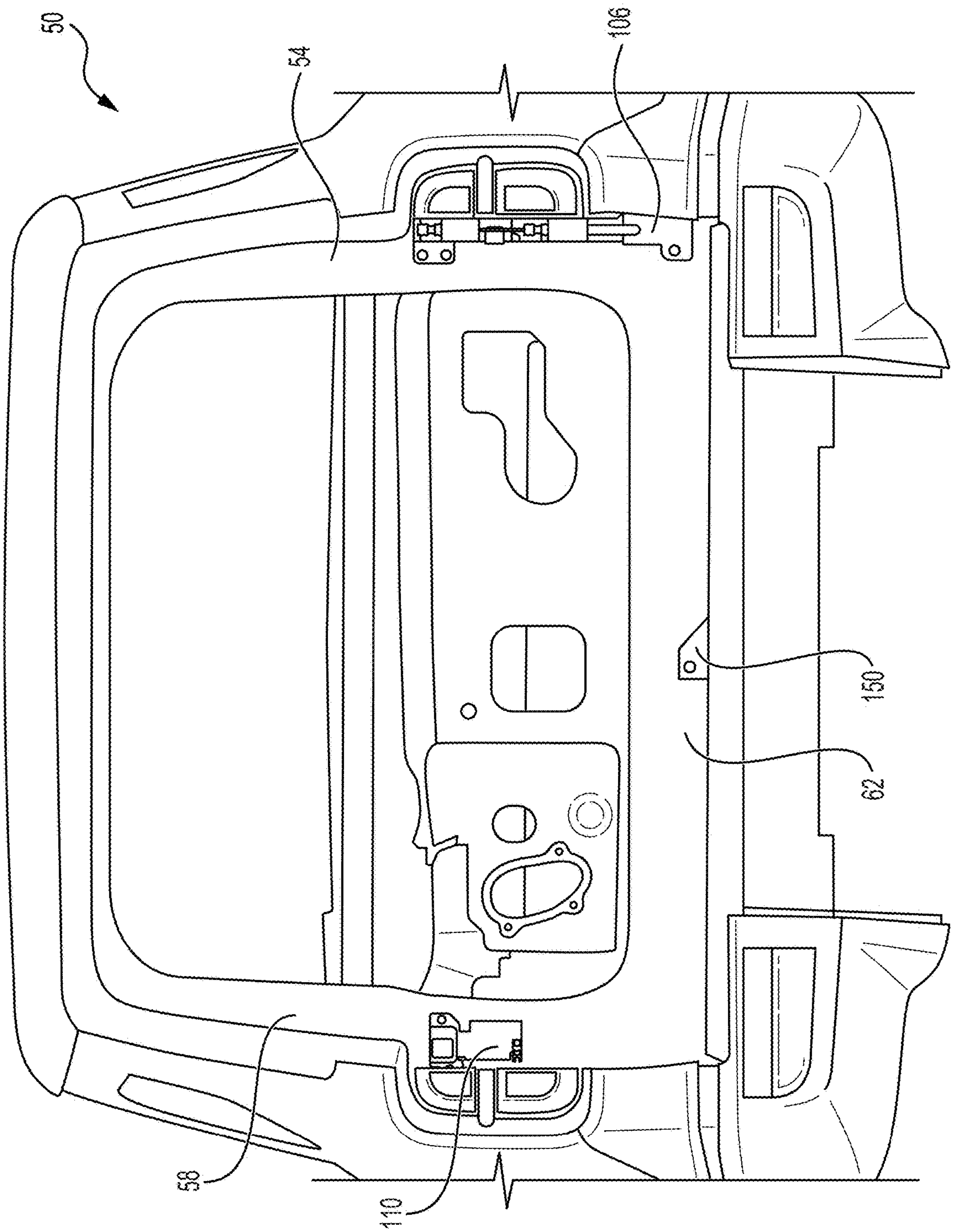
FIG. 22 is a rear view of a vehicle frame of the vehicle of FIG. 1 including the three attachment points of FIG. 5, according to some implementations.

As shown in FIG. 22, the hinge bracket 106 is mounted to the first rear pillar 54 inboard or inside the first rear light 82, the strike plate 110 is mounted to the second rear pillar 58 inboard or inside the second rear light 86, and the lower support pin 150 is mounted to the lower frame member 62. The three attachment points provide a strong support structure for the spare wheel carrier 90.

Figure 23:
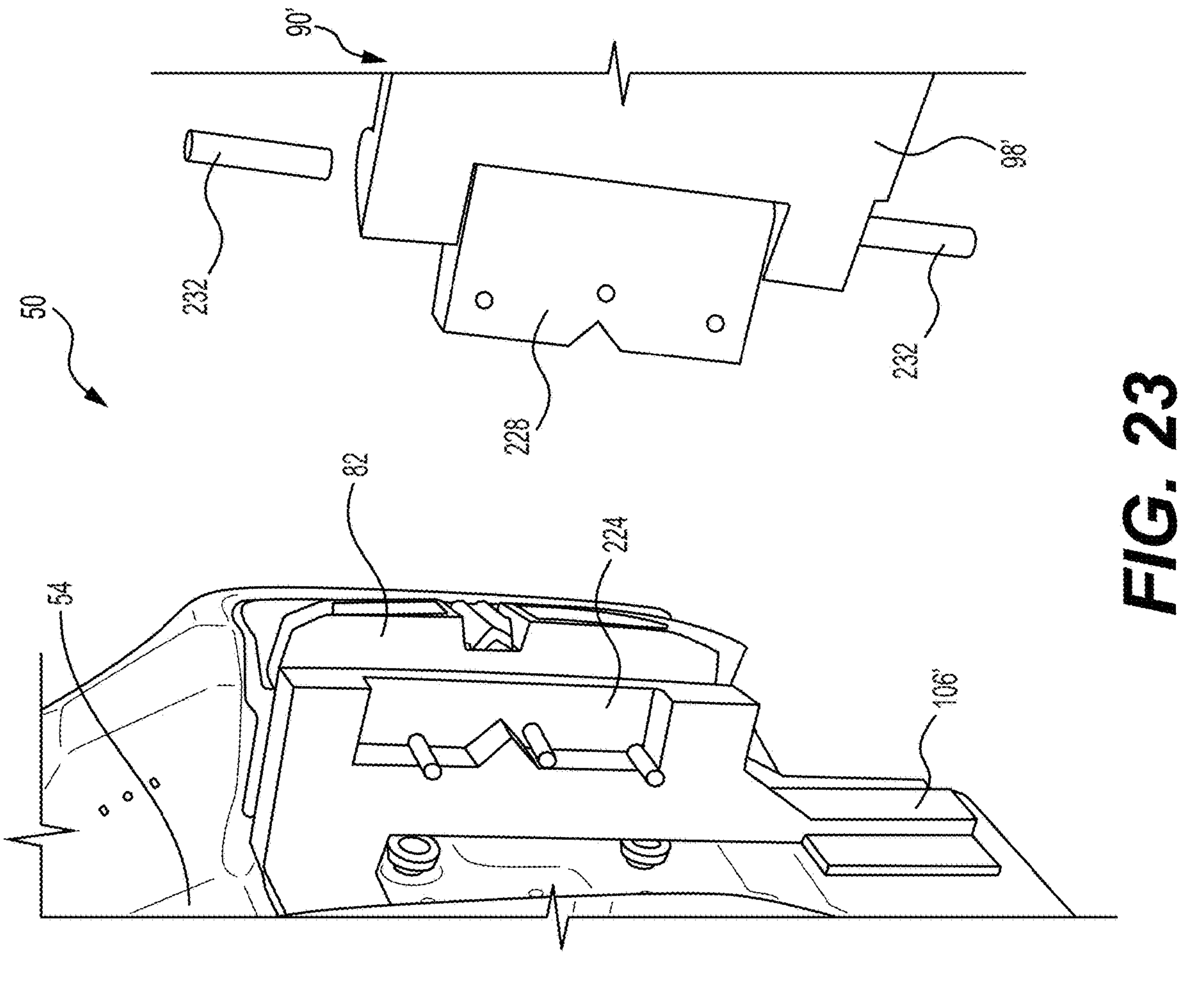
FIG. 23 is a perspective view of another spare wheel carrier, according to some implementations.

As shown in FIG. 23, another spare wheel carrier 90' is similar to the spare wheel carrier 90 discussed above. The spare wheel carrier 90' connects to a hinge bracket 106' that defines a hinge bracket recess 224. A hinge plate 228 is connected to the carrier beam 98' is sized to be received in the hinge bracket recess 224 and is rotationally connected t the carrier beam 98' via hinge pins 232. In some implementations, the hinge bracket recess 224 includes a locating feature (e.g., a distinct shape such as a triangle) that matches the hinge plate 228 and helps position the hinge plate 228 within the hinge bracket recess 224. In some implementations, the hinge plate 228 is installed onto the carrier beam 98' before the hinge plate 228 is fastened to the hinge bracket 106' within the hinge bracket recess 224.

For purposes of this description, certain advantages and novel features of the aspects and configurations of this disclosure are described herein. The described methods, systems, and apparatus should not be construed as limiting in any way. Instead, the present disclosure is directed toward all novel and nonobvious features and aspects of the various disclosed aspects, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Features disclosed in this specification (including any accompanying claims, abstract, and drawings), and/or all of the steps of any method or process so disclosed, may be combined in any combination, except combinations where at least some of such features and/or steps are mutually exclusive. The claimed features extend to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a", "an", and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. The terms "about" and "approximately" are defined as being "close to" as understood by one of ordinary skill in the art. In one non-limiting aspect the terms are defined to be within 10%. In another non-limiting aspect, the terms are defined to be within 5%. In still another non-limiting aspect, the terms are defined to be within 1%.

The terms "coupled", "connected", and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Certain terminology is used in the following description for convenience only and is not limiting. The words "right", "left", "lower", and "upper" designate direction in the drawings to which reference is made. The words "inner" and "outer" refer to directions toward and away from, respectively, the geometric center of the described feature or device. The words "distal" and "proximal" refer to directions taken in context of the item described and, with regard to the instruments herein described, are typically based on the perspective of the practitioner using such instrument, with "proximal" indicating a position closer to the practitioner and "distal" indicating a position further from the practitioner. The terminology includes the above-listed words, derivatives thereof, and words of similar import.

Throughout the description and claims of this specification, the word "comprise" and variations of the word, such as "comprising" and "comprises", means "including but not limited to", and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the form disclosed. Many modifications and variations will be apparent to those of ordinary skill in the art without departing from the scope and spirit of the present disclosure.

EXAMPLES

Example 1. A spare wheel carrier for a vehicle, the spare wheel carrier comprising: a hinge bracket configured to rigidly couple to a first rear pillar, the hinge bracket including: a first hinge stud, and a second hinge stud; a strike plate configured to rigidly couple to a second rear pillar arranged on an opposite side of the vehicle from the first rear pillar; a frame lower support configured to rigidly couple to a lower frame member arranged between the first rear pillar and the second rear pillar; and a carrier beam rotatably coupled to the first hinge stud and the second hinge stud and including: a latch positioned to selectively engage the strike plate, and a gate lower support positioned to selectively engage the frame lower support.

Example 2. The spare wheel carrier of example 1, wherein the strike plate includes a strike plate receiver, and wherein the latch includes a latch pin sized to be received within the strike plate receiver.

Example 3. The spare wheel carrier of example 1, wherein the frame lower support includes a lower support pin, and wherein the gate lower support includes a lower support receiver sized to receive the lower support pin.

Example 4. The spare wheel carrier of example 3, wherein the lower support receiver includes an elastomeric inner sleeve.

Example 5. The spare wheel carrier of example 3, wherein the lower support pin and the lower support receiver provides preload less than 100 N.

Example 6. The spare wheel carrier of example 3, wherein the lower support pin and the lower support receiver provides preload defining a preload length of 2 mm to 6 mm.

Example 7. The spare wheel carrier of example 1, wherein the latch includes a latch pin, wherein the frame lower support includes a lower support pin, and wherein the lower support pin is separated from the latch pin by a vertical distance of 250 mm to 350 mm.

Example 8. The spare wheel carrier of example 1, wherein the first hinge stud defines a first hinge interface plane, wherein the second hinge stud defines a second hinge interface plane, and wherein the first hinge interface plane is spaced from the second hinge interface plane by 150 mm to 225 mm.

Example 9. The spare wheel carrier of example 1, wherein the hinge bracket includes a hinge strut bracket, and wherein the carrier beam includes a carrier strut mount, the spare wheel carrier further comprising a strut extending between the hinge strut bracket and the carrier strut mount.

Example 10. The spare wheel carrier of example 9, wherein the hinge strut bracket is positioned between the first hinge stud and the second hinge stud.

Example 11. The spare wheel carrier of example 9, wherein the first hinge stud defines a first hinge interface plane, wherein the second hinge stud defines a second hinge interface plane, and wherein the hinge strut bracket is positioned between the first hinge interface plane and the second hinge interface plane.

Example 12. The spare wheel carrier of example 1, further comprising a handle coupled to the carrier beam and configured to control operation of the latch.

Example 13. The spare wheel carrier of example 1, further comprising a wheel cover coupled to the carrier beam.

Example 14. The spare wheel carrier of example 13, wherein the wheel cover is rotationally coupled to the carrier beam by a cover hinge.

Example 15. The spare wheel carrier of example 1, further comprising a wheel projection extending from the carrier beam and configured to fasten to a spare wheel.

Example 16. A spare wheel carrier for a vehicle, the spare wheel carrier comprising: a hinge bracket including: a first hinge stud, and a second hinge stud; a carrier beam rotatably coupled to the first hinge stud and the second hinge stud; a latch pin coupled to the carrier beam and spaced from the hinge bracket; a strike plate receiver sized to receive the latch pin; a lower support extending downwardly from the carrier beam; a lower support receiver coupled to the lower support; and a lower support pin sized to be received within the lower support receiver, wherein the lower support receiver is spaced vertically below the latch pin by 250 mm to 350 mm.

Example 17. The spare wheel carrier of example 16, wherein the lower support pin and the lower support receiver provides preload less than 100 N, or a preload length of 2 mm to 6 mm.

Example 18. The spare wheel carrier of example 16, wherein the latch pin is positioned adjacent a latch.

Example 19. A spare wheel carrier for a vehicle, the spare wheel carrier comprising: a hinge bracket defining a first hinge interface plane and a second hinge stud defining a second hinge interface plane; a carrier beam rotationally coupled to the hinge bracket; a strut extending between the hinge bracket and the carrier beam between the first hinge interface plane and the second hinge interface plane; a latch pin coupled to the carrier beam opposite the hinge bracket; and a lower support pin coupled to the carrier beam via a lower support.

Example 20. The spare wheel carrier of example 19, wherein the first hinge interface plane is spaced from the second hinge interface plane by 150 mm to 225 mm.

Example 21. A vehicle comprising: a first rear pillar; a second rear pillar spaced from the first rear pillar; a bench gate pivotable between the first rear pillar and the second rear pillar; a window gate arranged above the bench gate, the bench gate and the window gate defining an interface seam; and a spare wheel carrier including: a hinge bracket rigidly coupled to the first rear pillar, the hinge bracket including a first hinge stud, and a second hinge stud, the interface seam positioned between the first hinge stud and the second hinge stud; a strike plate rigidly coupled to the second rear pillar; and a carrier beam rotatably coupled to the first hinge stud and the second hinge stud and including a latch positioned to selectively engage the strike plate.

Example 22. The vehicle of example 21, further comprising: a first rear light coupled to the first rear pillar; and a second rear light coupled to the second rear pillar, wherein the spare wheel carrier is positioned between the first rear light and the second rear light.

Example 23. The vehicle of example 21, wherein the carrier beam defines a height between an upper extremity and a lower extremity of 250 mm to 350 mm.

Example 24. The vehicle of example 21, wherein the first hinge stud defines a first hinge interface plane, wherein the second hinge stud defines a second hinge interface plane, and wherein the first hinge interface plane is spaced from the second hinge interface plane by 150 mm to 225 mm.

Example 25. The vehicle of example 21, wherein the interface seam extends substantially parallel to a ground plane.

Example 26. The vehicle of example 21, further comprising: a first rear light coupled to the first rear pillar, wherein the hinge bracket is coupled to the first rear pillar behind the first rear light.

Example 27. The vehicle of example 21, further comprising: a lower frame member extending between the first rear pillar and the second rear pillar; and a lower support pin coupled to the lower frame member, wherein the spare wheel carrier includes a lower support receiver coupled to the carrier beam and sized to receive the lower support pin.

Example 28. The vehicle of example 27, wherein the spare wheel carrier further includes a lower support extending downward from the carrier beam and supporting the lower support receiver.

Example 29. The vehicle of example 27, wherein the lower support pin and the lower support receiver provides preload less than 100 N.

Example 30. The vehicle of example 27, wherein the lower support pin and the lower support receiver provides a preload length of 2 mm to 6 mm.

Example 31. The vehicle of example 27, wherein latch includes a latch pin, wherein the strike plate includes a strike plate receiver sized to receive the latch pin, and wherein the lower support pin is separated from the latch pin by a vertical distance of 250 mm to 350 mm.

Example 32. The vehicle of example 21, wherein the latch includes a latch pin, and wherein the strike plate includes a strike plate receiver sized to receive the latch pin.

Example 33. The vehicle of example 21, further comprising: a strut extending between the hinge bracket and the carrier beam between the first hinge stud and the second hinge stud.

Example 34. The vehicle of example 21, wherein the spare wheel carrier further includes a wheel cover rotationally coupled to the carrier beam by a cover hinge.

Example 35. The vehicle of example 21, wherein the spare wheel carrier further includes a wheel projection extending from the carrier beam and configured to fasten to a spare wheel.

Example 36. A vehicle comprising: a first rear pillar; a second rear pillar spaced from the first rear pillar; a lower frame member extending between the first rear pillar and the second rear pillar; a bench gate pivotable relative to the lower frame member; a window gate arranged above the bench gate, the bench gate and the window gate defining an interface seam; a hinge bracket rigidly coupled to the first rear pillar, the hinge bracket including a first hinge stud, and a second hinge stud; a strike plate receiver rigidly coupled to the second rear pillar; a lower support pin rigidly coupled to the lower frame member; and a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position.

Example 37. The vehicle of example 36, wherein the first hinge stud is spaced from the second hinge stud by 150 mm to 225 mm.

Example 38. The vehicle of example 36, wherein the carrier beam defines a height between an upper extremity and a lower extremity of 250 mm to 350 mm.

Example 39. A vehicle comprising: a first rear pillar; a second rear pillar spaced from the first rear pillar; a lower frame member extending between the first rear pillar and the second rear pillar; a bench gate pivotable relative to the lower frame member; a window gate arranged above the bench gate, the bench gate and the window gate defining an interface seam; and a spare wheel carrier including: a hinge bracket rigidly coupled to the first rear pillar, the hinge bracket including a first hinge stud, and a second hinge stud; a strike plate receiver rigidly coupled to the second rear pillar; a lower support pin rigidly coupled to the lower frame member; a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position, the carrier beam defines a height between an upper extremity and a lower extremity of 250 mm to 350 mm; and a wheel cover coupled to the carrier beam and configured to surround a wheel fastened to the carrier beam.

Example 40. The vehicle of example 39, wherein the lower support pin and the lower support receiver provides preload less than 100 N, or a preload length of 2 mm to 6 mm.

Example 41. A spare wheel carrier for a vehicle, the spare wheel carrier comprising: a hinge bracket configured to be rigidly coupled to a first rear pillar of the vehicle and including: a first hinge defining a hinge axis, and a second hinge positioned on the hinge axis, wherein the second hinge spaced from the first hinge by less than 300 mm; a carrier beam rotatably coupled to the first hinge and the second hinge, the carrier beam configured to support a spare wheel; and a strut coupled between the hinge bracket and the carrier beam and positioned between the first hinge and the second hinge.

Example 42. The spare wheel carrier of example 41, wherein the first hinge defines a first hinge interface plane, wherein the second hinge defines a second hinge interface plane, and wherein the first hinge interface plane is spaced from the second hinge interface plane by 150 mm to 225 mm.

Example 43. The spare wheel carrier of example 41, wherein the carrier beam defines a height between an upper extremity and a lower extremity of 250 mm to 350 mm.

Example 44. The spare wheel carrier of example 41, further comprising: a wheel projection extending from the carrier beam and sized to receive the spare wheel.

Example 45. The spare wheel carrier of example 41, further comprising: a lower support pin; and a lower support receiver coupled to the carrier beam and sized to receive the lower support pin.

Example 46. The spare wheel carrier of example 45, further comprising: a lower support extending downward from the carrier beam and supporting the lower support receiver.

Example 47. The spare wheel carrier of example 45, wherein the lower support pin and the lower support receiver provides preload less than 100 N.

Example 48. The spare wheel carrier of example 45, wherein the lower support pin and the lower support receiver provides a preload length of 2 mm to 6 mm.

Example 49. The spare wheel carrier of example 45, further comprising: a latch coupled to the carrier beam; a latch pin coupled to the carrier beam, a strike plate positioned to engage the latch; and a strike plate receiver sized to receive the latch pin.

Example 50. The spare wheel carrier of example 49, wherein the lower support pin is separated from the latch pin by a vertical distance of 250 mm to 350 mm.

Example 51. The spare wheel carrier of example 49, further comprising a handle coupled to the carrier beam and configured to control operation of the latch.

Example 52. The spare wheel carrier of example 41, further comprising: a wheel cover coupled to the carrier beam by a cover hinge and a removable fastener.

Example 53. The spare wheel carrier of example 52, wherein the wheel cover includes a license plate mount, license plate lights, and a reverse camera.

Example 54. The spare wheel carrier of example 41, wherein the carrier beam is sized to be received between rear lights of the vehicle.

Example 55. The spare wheel carrier of example 41, wherein the hinge bracket includes an upper bracket pad and a lower bracket pad configured to engage the first rear pillar, and wherein the first hinge and the second hinge are positioned between the upper bracket pad and the lower bracket pad.

Example 56. A spare wheel carrier for a vehicle, the spare wheel carrier comprising: a hinge bracket configured to be rigidly coupled to a first rear pillar of the vehicle and including: a first hinge defining a first hinge interface plane, and a second hinge defining a second hinge interface plane, wherein the first hinge interface plane is spaced from the second hinge interface plane by 150 mm to 225 mm; a carrier beam rotatably coupled to the first hinge and the second hinge, the carrier beam configured to support a spare wheel; and a strut coupled between the hinge bracket and the carrier beam and positioned between the first hinge interface plane and the second hinge interface plane.

Example 57. The spare wheel carrier of example 56, wherein the hinge bracket further includes a bracket strut mount engaged with the strut, and wherein the strut extends substantially parallel to a ground plane.

Example 58. The spare wheel carrier of example 56, further comprising: a latch coupled to the carrier beam; a latch pin coupled to the carrier beam, a strike plate positioned to engage the latch; a strike plate receiver sized to receive the latch pin; a lower support receiver coupled to the carrier beam; and a lower support pin sized to be received by the lower support receiver, wherein the lower support pin is separated from the latch pin by a vertical distance of 250 mm to 350 mm.

Example 59. A spare wheel carrier for a vehicle, the spare wheel carrier comprising: a hinge bracket defining a first hinge interface plane and a second hinge stud defining a second hinge interface plane; a carrier beam rotationally coupled to the hinge bracket and defining a height between an upper extremity and a lower extremity of 250 mm to 350 mm; a strut extending between the hinge bracket and the carrier beam between the first hinge interface plane and the second hinge interface plane; a latch pin coupled to the carrier beam opposite the hinge bracket; and a lower support pin coupled to the carrier beam via a lower support.

Example 60. The spare wheel carrier of example 59, wherein the first hinge interface plane is spaced from the second hinge interface plane by 150 mm to 225 mm.

What is claimed is:

1. A vehicle comprising:

a first rear pillar;

a second rear pillar spaced from the first rear pillar;

a bench gate pivotable between the first rear pillar and the second rear pillar;

a window gate arranged above the bench gate, the bench gate and the window gate defining an interface seam; and a spare wheel carrier including:

a hinge bracket rigidly coupled to the first rear pillar, the hinge bracket including a first hinge stud, and a second hinge stud, the interface seam positioned between the first hinge stud and the second hinge stud;

a strike plate rigidly coupled to the second rear pillar; and a carrier beam rotatably coupled to the first hinge stud and the second hinge stud and including a latch positioned to selectively engage the strike plate.

2. The vehicle of claim 1, further comprising:

a first rear light coupled to the first rear pillar; and a second rear light coupled to the second rear pillar, wherein the spare wheel carrier is positioned between the first rear light and the second rear light.

3. The vehicle of claim 1, wherein the carrier beam defines a height between an upper extremity and a lower extremity of 250 mm to 350 mm.

4. The vehicle of claim 1, wherein the first hinge stud defines a first hinge interface plane, wherein the second hinge stud defines a second hinge interface plane, and wherein the first hinge interface plane is spaced from the second hinge interface plane by 150 mm to 225 mm.

5. The vehicle of claim 1, wherein the interface seam extends substantially parallel to a ground plane.

6. The vehicle of claim 1, further comprising:

a first rear light coupled to the first rear pillar, wherein the hinge bracket is coupled to the first rear pillar behind the first rear light.

7. The vehicle of claim 1, further comprising:

a lower frame member extending between the first rear pillar and the second rear pillar; and a lower support pin coupled to the lower frame member, wherein the spare wheel carrier includes a lower support receiver coupled to the carrier beam and sized to receive the lower support pin.

8. The vehicle of claim 7, wherein the spare wheel carrier further includes a lower support extending downward from the carrier beam and supporting the lower support receiver.

9. The vehicle of claim 7, wherein the lower support pin and the lower support receiver provides preload less than 100 N.

10. The vehicle of claim 7, wherein the lower support pin and the lower support receiver provides a preload length of 2 mm to 6 mm.

11. The vehicle of claim 7, wherein latch includes a latch pin, wherein the strike plate includes a strike plate receiver sized to receive the latch pin, and wherein the lower support pin is separated from the latch pin by a vertical distance of 250 mm to 350 mm.

12. The vehicle of claim 1, wherein the latch includes a latch pin, and wherein the strike plate includes a strike plate receiver sized to receive the latch pin.

13. The vehicle of claim 1, further comprising:

a strut extending between the hinge bracket and the carrier beam between the first hinge stud and the second hinge stud.

14. The vehicle of claim 1, wherein the spare wheel carrier further includes a wheel cover rotationally coupled to the carrier beam by a cover hinge.

15. The vehicle of claim 1, wherein the spare wheel carrier further includes a wheel projection extending from the carrier beam and configured to fasten to a spare wheel.

16. A vehicle comprising:

a first rear pillar;

a second rear pillar spaced from the first rear pillar;

a lower frame member extending between the first rear pillar and the second rear pillar;

a bench gate pivotable relative to the lower frame member;

a window gate arranged above the bench gate, the bench gate and the window gate defining an interface seam;

a hinge bracket rigidly coupled to the first rear pillar, the hinge bracket including a first hinge stud, and a second hinge stud;

a strike plate receiver rigidly coupled to the second rear pillar;

a lower support pin rigidly coupled to the lower frame member; and a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position.

17. The vehicle of claim 16, wherein the first hinge stud is spaced from the second hinge stud by 150 mm to 225 mm.

18. The vehicle of claim 16, wherein the carrier beam defines a height between an upper extremity and a lower extremity of 250 mm to 350 mm.

19. A vehicle comprising:

a first rear pillar;

a second rear pillar spaced from the first rear pillar;

a lower frame member extending between the first rear pillar and the second rear pillar;

a bench gate pivotable relative to the lower frame member;

a window gate arranged above the bench gate, the bench gate and the window gate defining an interface seam; and a spare wheel carrier including:

a hinge bracket rigidly coupled to the first rear pillar, the hinge bracket including a first hinge stud, and a second hinge stud;

a strike plate receiver rigidly coupled to the second rear pillar;

a lower support pin rigidly coupled to the lower frame member;

a carrier beam rotatably coupled to the first hinge stud and the second hinge stud and including a latch pin positioned to selectively engage the strike plate receiver, a lower support receiver positioned to engage the lower support pin, the carrier beam covering the interface seam when arranged in a closed carrier position, the carrier beam defines a height between an upper extremity and a lower extremity of 250 mm to 350 mm; and a wheel cover coupled to the carrier beam and configured to surround a wheel fastened to the carrier beam.

20. The vehicle of claim 19, wherein the lower support pin and the lower support receiver provides preload less than 100 N, or a preload length of 2 mm to 6 mm.

* * * * *